US007948867B2

(12) United States Patent
Inoue et al.

(10) Patent No.: US 7,948,867 B2
(45) Date of Patent: *May 24, 2011

(54) PROGRAM RECEPTION/EXECUTION APPARATUS THAT CAN COMMENCE EXECUTION OF A MACHINE PROGRAM HAVING ONLY RECEIVED THE PROGRAM IN PART, AND A PROGRAM TRANSMISSION APPARATUS THAT ENABLES SUCH EXECUTION

(75) Inventors: Shinji Inoue, Osaka (JP); Masahiro Oashi, Osaka (JP); Yuki Kusumi, Nara (JP); Tatsuya Shimoji, Osaka (JP); Ikuo Minakata, Kyoto (JP); Masayuki Kozuka, Osaka (JP); Yoshihiro Mimura, Osaka (JP); Yoshiyuki Miyabe, Osaka (JP); Kazuo Okamura, Osaka (JP); Takashi Kakiuchi, Osaka (JP); Junichi Hirai, Osaka (JP); Naoya Takao, Osaka (JP); Toshiya Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 1688 days.

This patent is subject to a terminal disclaimer.

(21) Appl. No.: 11/169,253

(22) Filed: Jun. 27, 2005

(65) Prior Publication Data

US 2005/0238334 A1 Oct. 27, 2005

Related U.S. Application Data

(62) Division of application No. 10/414,992, filed on Apr. 16, 2003, now Pat. No. 6,944,861, which is a division of application No. 09/692,703, filed on Oct. 19, 2000, now Pat. No. 6,609,144, which is a division of application No. 09/068,321, filed on May 4, 1998, now Pat. No. 6,157,948.

(51) Int. Cl.
G06F 15/16 (2006.01)
(52) U.S. Cl. .................. 370/209; 709/202; 709/223
(58) Field of Classification Search .......... 709/200–202, 709/227, 223
See application file for complete search history.

(56) References Cited

U.S. PATENT DOCUMENTS

| 5,079,695 A | 1/1992 | Dysart et al. |
| 5,440,632 A | 8/1995 | Bacon et al. |
| 5,701,582 A * | 12/1997 | DeBey ......................... 725/103 |
| 5,864,562 A | 1/1999 | Pascucci |
| 5,864,862 A | 1/1999 | Kriens |
| 5,983,366 A | 11/1999 | King |

(Continued)

FOREIGN PATENT DOCUMENTS

EP 0 680 185 A2 11/1995

(Continued)

OTHER PUBLICATIONS

J. Hedger, "Telesoftware: Home Computing Via Broadcast Teletext", Independent Television, Southbank TV Center, London, U.K., IEEE Transactions on Consumer Electronics, vol. CE-25, No. 3, Jul. 1979, pp. 279-287.

Funkschau Oct. 1995, Trade Magazine for Electronic Communication "Internet/World Wide Web: Navigators Through the Information Flood", Apr. 28, 1995, pp. 64-67 (with 5 pages of English translation).

(Continued)

Primary Examiner — Moustafa M Meky

(57) ABSTRACT

When a program transmission apparatus divides a program into a plurality of partial programs before transmission, a program reception execution apparatus executes a partial program when the partial program has already been received, and, when the execution needs to proceed to from a present partial program to a next partial program, executes the other partial program when the next partial program has been received.

1 Claim, 26 Drawing Sheets

U.S. PATENT DOCUMENTS

| | | | |
|---|---|---|---|
| 5,990,955 A | 11/1999 | Koz | |
| 6,157,948 A * | 12/2000 | Inoue et al. | 709/219 |
| 6,324,687 B1 | 11/2001 | Beadle et al. | |
| 6,519,693 B1 * | 2/2003 | Debey | 712/201 |
| 7,594,250 B2 * | 9/2009 | Debey | 725/103 |
| 2004/0064497 A1 * | 4/2004 | Debey | 709/201 |
| 2006/0244824 A1 * | 11/2006 | Debey | 348/100 |

FOREIGN PATENT DOCUMENTS

| | | |
|---|---|---|
| EP | 0 680 213 A2 | 11/1995 |
| EP | 0 690 400 A2 | 1/1996 |
| JP | 1-312647 | 12/1989 |
| JP | H08-6878 | 6/1994 |
| JP | H08-36519 | 7/1994 |
| JP | H08-202638 | 1/1995 |
| JP | 07231308 A | 8/1995 |
| WO | WO 95/33338 | 12/1995 |

OTHER PUBLICATIONS

Kimura et al., "MPEG-2 Systems ISBD—An application of MPEG-2 Systems to ISDB transport system", The Institute of Television Engineers of Japan, ITEJ Technical Report, vol. 18, No. 28, pp. 7-12, May 1994 (with English abstract).

European Search Report, Dated Jan. 19, 2005, relating to EP Application No. 04 02 6784.

Bissel, R.A. et al., "The Set-Top Box For Interactive Services", BG Technology Journal, BT Laboratories, vol. 13, No. 4, Oct. 1, 1995.

Gossling, J. et al., "The Java Language Environment, A White Paper", Sun Delivers Java Workshop, October.

Kimura, T. et al., "An Application of MPEG-2 Systems To ISDB Transport System", ITE Technical Report, vol. 18, No. 28, May 1994.

Gosling, J. et al., "The Java™ Language Specification", Chapter 12 Execution, Java Language Specification, Aug. 1, 1996, pp. 215-236.

* cited by examiner

FIG. 17

ERROR PROCESSING TABLE 501

| ERROR CODE | ERROR PROCESSING CODE |
|---|---|
| 001 | 0102 |
| 002 | 0399 |
| 003 | 0104 |

| CAUSE |
|---|
| Div by 0 |
| Stack Over Flow |
| Stream not found |

ERROR PROCESSING WITHIN ERROR PROCESSING TABLE 502

| ERROR CODE | |
|---|---|
| 001 | 0201 |
| 002 | 0305 |
| 003 | 0201 |

| CAUSE |
|---|
| Div by 0 |
| Stack Over Flow |
| Stream not found |

ERROR PROCESSING CODE 503

| CODE | CONTENT | OP | CONTENT |
|---|---|---|---|
| 01 | PRESENT CONTENT CANCEL | 01 | EPG |
| | | 02 | DEFAULT PROCESSING FOR SERVICE |
| | | 03 | PREVIOUS CHANNEL |
| | | 04 | REREAD |
| 02 | ERROR PANEL DISPLAYED | 02 | DEFAULT PROCESSING FOR SERVICE |
| | | 04 | REREAD |
| 03 | ERROR HANDLER ACTIVATED | 05 | DEFAULT ERROR HANDLER |
| | | XX | ACTIVATION OF HANDLER ID(XX) |

FIG. 18

DEFAULT ERROR PROCESSING TABLE 601

| ERROR CODE | ERROR PROCESSING CODE | | CAUSE |
|---|---|---|---|
| 001 | 0202 | | Div by 0 |
| 002 | 0202 | | Stack Over Flow |
| 003 | 0104 | | Stream not found |

DEFAULT ERROR PROCESS IN ERROR PROCESSING TABLE 602

| ERROR CODE | ERROR PROCESSING CODE | | CAUSE |
|---|---|---|---|
| 001 | 0102 | | Div by 0 |
| 002 | 0102 | | Stack Over Flow |
| 003 | 0102 | | Stream not found |

PROGRAM RECEPTION/EXECUTION APPARATUS THAT CAN COMMENCE EXECUTION OF A MACHINE PROGRAM HAVING ONLY RECEIVED THE PROGRAM IN PART, AND A PROGRAM TRANSMISSION APPARATUS THAT ENABLES SUCH EXECUTION

CROSS-REFERENCE TO RELATED APPLICATIONS

This application is a divisional application of U.S. Ser. No. 10/414,992, filed on Apr. 16, 2003, now U.S. Pat. No. 6,944,861 issued on Sep. 13, 2005 which is a divisional application of U.S. Ser. No. 09/692,703 filed on Oct. 19, 2000, now U.S. Pat. No. 6,609,144, issued on Aug. 19, 2003, which is a divisional of U.S. Ser. No. 09/068,321 filed on May 4, 1998, now U.S. Pat. No. 6,157,948, issued on Dec. 5, 2000.

BACKGROUND OF THE INVENTION

1. Field of the Invention

The present invention relates to a program reception/execution apparatus that receives and executes a transmitted machine program and to a program transmission apparatus for transmitting such a machine program, and in particular to a program reception/execution apparatus that receives and executes a transmitted machine program for performing control that relates to programs broadcast by a digital broadcasting system and to a program transmission apparatus for transmitting such a machine program.

2. Related Art

In recent years there have been rapid advances in techniques relating to the digitization of various kinds of information signals, such as audio and video. As a result, a great amount of research and development is being performed all over the world with the aim of achieving a system capable of acting both as a digital broadcasting system and digital communication system.

In the development of digital broadcasting systems, one of the most important issues is the compression processing of digitized image signals and audio signals. Standards such as Moving Picture Image Coding Experts Group (MPEG), Joint Photographic Coding Experts Group (JPEG) and H.261 have become established as the main techniques for compression processing for these kinds of data, although another technique known as ISO/IEC 13818 [ISO/IEC JTC (Joint Technical Committee)1/SC(Subcommittee)29/WG(Working Group)] has been proposed by the ISO (International Organization for Standardization) and the IEC (International Electrotechnical Commission). This technique is a broad technique that applies to broadcasting, communication, and storage media and is currently under review prior to becoming an international standard.

The technique known as ISO/IEC 13818 does not only apply to a data compression method, but also stipulates a method to be used for a control part for a digital broadcasting system where a broadcaster separately performs a compression process on digital images, audio, and other data that compose a program and multiplexes the compressed data into a bitstream, while a receiver apparatus selectively receives a desired program. It should be noted here that in this specification, the term "program" refers to a TV program or other such event which is broadcast, while the term "machine program" refers to a collection of one or more instructions which is conventionally known as a (computer) program.

The following is a description of the compression processing performed for digital image data and digital audio data and the multiplexing of the compressed data into a bitstream for communication purposes, based on the regulations of ISO/IEC 13818. This description will refer to FIG. 1, FIG. 2, and FIG. 3.

FIG. 1 is an overview of the components which perform the compression processing on the digital image data and digital audio data, and multiplex the compressed data into a bitstream.

After digital image data has been compressed by the image encoding circuit 1311 and converted into an image elementary stream ("image ES"), it is outputted to the packetizing circuit 1312 where it is divided into packet units to convert it into an image Packetized Elementary Stream (PES) that will form one frame. This packetized elementary stream is then supplied to the multiplexing circuit 1313. The digital audio data is compressed by the audio encoding circuit 1314 and so converted into an audio ES. This audio ES is supplied to the packetizing circuit 1315 where it is divided into packet units to convert it into an audio PES that will form one frame. The audio PES is also supplied to the multiplexing circuit 1313. The multiplexing circuit 1313 multiplexes the image PES and the audio PES according to time division multiplexing and so generates a multiplexed signal in packet units composed of 188 bytes that form a Transport Stream (TS).

In the multiplexed signal, both images and audio are divided up into one frame units, with these being composed of PES that have been appended with a header.

FIG. 2 shows the composition of a PES.

As shown in FIG. 2, the PES have variable lengths. To allow the time division multiplexing of audio and images, the PES created as described above are divided into 184 byte units to convert them into packets, with each packet being given a 4-byte header to form 188-byte transport packets (TP).

FIG. 3 shows the components used for forming a bitstream for broadcasting purposes.

As shown in FIG. 3, "program 1" is composed of a single program, with the multiplexing circuit 15161 multiplexing two sets of image data, two sets of audio data, one set of other information data, and one Program Map Table (PMT). This PMT includes information such as a Packet Identifier (PID) for identifying the image data, audio data, and information data as well as information relating to programs and the like. As shown in FIG. 3, by using n multiplexing circuits 15161, 15162, . . . 1516n, n programs can be set. The data that composes the n programs set in this way is then multiplexed according to time division by the multiplexing circuit 1517.

The multiplexing circuit 1517 multiplexes information, such as a Program Association Table (PAT) as general program information for extracting the PMT of each program, a Conditional Access Table (CAT) for controlling the scrambling of the data, a Network Information Table (NIT) showing information about the network being used, according to time division. These four kinds of table, PMT, PAT, CAT, and NIT relating to program information are set in accordance with ISO/IEC 13818 standard. The PIDs of these tables are such that the PAT has the PID "00", the CAT has the PID "01", and the PIDs of the PMT and the NID can be set freely.

It should be noted here that in FIG. 1, the multiplexing of only images and audio is shown, although in reality a variety of other kinds of data, such as additional information data for the programs and program information, are converted into TP and are multiplexed with the images and audio according to time division. These other kinds of data are composed of objects for various programs, with the provision of such objects allowing a greater variety of programs to be realized by the digital broadcasting system. An example of such a system is disclosed by Japanese Laid-Open Patent Application H07-231308.

The data processing method used in a conventional digital broadcasting system is described below.

FIG. 4 shows an example configuration of a digital broadcast reception apparatus in a conventional digital broadcasting system.

The signal (package object) received by the reception antenna 16011 is inputted into the broadcast reception subsystem 16100 and is demodulated, before being stored in the secondary storage apparatus 16102, including the recording media 16014 composed of the magnetic disk (hard disk) 16014a and the magnetic-optical disk 16014b, via the data storage management unit 16101. The secondary storage apparatus 16102 is designed so that necessary data and machine programs can be stored via the external input/output management unit 16103 and so that the stored content can be read.

The reproduction subsystem 16104 is an independent processing system called a virtual machine. This is composed of standard software, and for the ease of explanation, has been shown as a collection of function blocks. These function blocks are the loader 16122, the fundamental class library 16121, the resource/security management unit 16123, the process (thread) management unit 16124, the intermediate code interpreter 16125, and the synchronization management unit 16126.

The fundamental class library 16121 is written in intermediate code, and is a collection of classes that are used by fundamental functions of the reproduction subsystem 16104, and by a variety of program objects and other objects. When using the objects belonging to the classes written in this fundamental class library 16121, it is not necessary to transmit a definition of the class so that only an indication of the class ID will suffice. The class definitions for program objects and package objects. themselves are also written in the fundamental class library 16121. This is to say, out of a machine program, the fundamental machine program objects are stored in the fundamental class library 16121 in advance. These fundamental machine program objects may be stored on a recording medium such as a floppy disk and distributed to consumers in advance so that they can be installed inside devices, or otherwise may be distributed by transmitting them from a broadcast center to a digital broadcast reception device after the user has signed a contract with the broadcast center.

The loader 16122 loads the machine programs (intermediate code) for the package objects stored in the secondary storage apparatus 16102 into the main storage 16107 via the resource/security management unit 16123 and the storage management unit 16106. When doing so, when code which has already been loaded is present in the main storage 16107 (as one example, code for the fundamental classes stored in the fundamental class library 16121 and code for user objects generated by the user), the loader 16122 generates a table showing the relationship between this code and the intermediate code.

The resource/security management unit 16123 performs processing such as destroying the data stored in the secondary storage apparatus 16102, preventing unauthorized users from accessing the data stored in components such as the secondary storage apparatus 16102 and the main storage 16107, and prohibiting the outputting of requests to the process management unit 16124. The resource/security management unit 16123 also prevents the destruction of data, alteration, or occupation of the CPU timer by certain objects.

The process management unit 16124 executes and manages various processes such as the main process, the timer process, and the reproduction process in accordance with the machine program stored in the main storage 16107.

The intermediate code interpreter 16125 successively interprets and executes intermediate code in a machine program stored in the fundamental class library 16121 or in a program loaded by the loader 16122.

The synchronization management unit 16126 manages the data which needs to be synchronously outputted, such as audio data and video data. In accordance with requests from the intermediate code interpreter 16125, the synchronization management unit 16126 performs the synchronization scheduling of a plurality of media objects in advance, and, based on the system clock, sends messages to each media object for functions such as reproduction start, stop, slow motion and double speed to perform synchronous control.

It should be noted here that the resource/security management unit 16123, the process management unit 16124, and the synchronization management unit 16126 will each have a different structure depending on the hardware configuration, while the fundamental class library 16121, the loader 16122, and the intermediate code interpreter 16125 are each composed of common elements that do not depend on the hardware configuration.

The communication subsystem 16105 operates under the control of the resource/security management unit 16123 and is used to receive and transmit various kinds of data via a predetermined transfer path to another digital broadcast reception apparatus or broadcast center.

The system clock generation circuit 16109 generates the system clock which it supplies to the process management unit 16124 and the synchronization management unit 16126.

The display/reproduction management unit 16110 outputs image data to the display device 16013 and audio data to the speaker 16111, out of the data supplied by the synchronization management unit 16126 or the intermediate code interpreter 16125.

In this way, when data and a machine program are formatted (see FIG. 7), the machine program is set in intermediate code and its processing system is set as a virtual machine, so that aside from dedicated reception devices, personal computers and other kinds of information terminals may be used as digital broadcast reception apparatuses.

When package objects are viewed by the viewer in real time, data for one day's broadcasts is included, although this data may be compressed before transmission so that the time required for data transfer can be drastically reduced to under twenty minutes. The program data and the machine program are converted into objects and may each be composed of any number of objects.

FIG. 5 shows the composition of a program object.

As shown in FIG. 5, when the program object P is an interactive drama, this program object P can be composed of a story object S and a CM (commercial message) object x. The story object S is in turn composed of the scene objects A through E and the CM object y. As one example, the scene object A may be composed of the video object A and the message object A, with the message object A being composed of the narration object A and the text object A. The CM object x, on the other hand, may be composed of the video object x and the product selection objects, with the product selection objects including the related program search objects l, m, and n in the present case.

FIG. 6 is a representation of the machine program objects that reproduce the program objects described above.

As shown in FIG. 6, player objects are provided beforehand in the digital satellite broadcasting reception apparatus as the fundamental machine language program objects (more precisely, these are generated as needed as described later in this text). As one example, when reproduction of program object 1 or program object 2 is requested out of the various program objects, these player objects will control the storage management unit 1821, the process management unit 1822, the data storage management unit 1823, and the communication subsystem 1824 and execute the reproduction processing. The details of this processing will be described later with reference to the flowchart in FIG. 8.

FIG. 7 shows the format of the program objects that are reproduced in this way.

As shown in FIG. 7, a program object is composed of a header part, a class definition part, and an object data part. The header part is composed of an object header, a program ID, a program name, a version, and an object dictionary. The object header is composed of an object ID of a program object, an object name, a class ID, a priority, and a size. The program ID is an ID for identifying the program object, while the program name is the name of the program object. The version shows a version number for the present program object when the present program object has been subject to amendment. The object dictionary, meanwhile, is an arrangement of data for accessing a predetermined object which is provided in the object data part.

Each object belongs to one class, and the class definition is given the frame of each object. More specifically, all of the objects that belong to one class have the commonly used variables and methods (machine programs) provided in the class definition part. This is to say, the class definition part can be composed of any number of class definitions. Each class definition is composed of a class ID, a class name, a superclass ID, a variable definition, a method dictionary, and a method. The class ID and the class name express the name and ID which are used to identify the class. The superclass ID, meanwhile, shows the class which is directly above the present class in a hierarchy. When viewed from the superclass level which is above the level of these classes, these lower classes are called "subclasses". The variable definition defines the variables that are used in the method (machine program) in the present class definition. A machine program stored as intermediate code (intermediate code generated from a source program composed of character string data) composes the method. In this way, by storing the method as intermediate code, the processing efficiency during execution can be raised and a reduction in the data amount can be achieved. The method dictionary includes data for accessing to each method (machine program) provided in the methods. In this class definition part, the definitions of the expanded classes which are included in this program object are collectively written. The class definitions present in the fundamental class library 16121 do not need to be included in the class definition part. As a result, if all of the objects included in program objects are instances of fundamental classes, a class definition part will not be required.

The object data part can be composed of any number of objects. Each object is composed of an object header and variable values. The object header is composed of an object ID, an object name, a class ID, a priority, and a size. The object ID and object name express an ID and a name for identifying the object. The class ID shows the class to which this object belongs. The priority shows the position of the object in a reproduction order, and is expressed as a numerical value between "0" and "3". In this order, larger values express higher priorities. The size shows the amount of data included in this object. The variable values are the material data itself, with these variable values also including control data.

A package object can be composed of any number of program objects, so that as one example, a package object may be composed of three program objects. Each package object is composed of a header part, a class definition part, and a program object data part. The object headers are arranged at the front of this header part, with each of these object headers including an object ID, an object name, a class ID, a priority, and a size. Following these object headers, the package ID and the package name are given. These express the name and ID of the present package object. Next, the date at which the package object was generated and the version number are given. After these, the program index is given. This program index includes data for accessing the object data part of the three program objects that are provided in the program object data part. The class definition part collectively stores the class definition parts of the three program objects in the package object. Here, duplicated data is omitted where appropriate from the class definition part of each program object. As described above, the class definition parts are written in intermediate code. Finally, the header parts and the object data of the package object are collectively written into program object data part.

The processing in the main process is described below with reference to FIG. 8.

In step S2021, the intermediate code interpreter 16125 controls the loader 16122 so that reception is performed by the antenna 16011 and the header part and class definition part (see FIG. 7) of a package object stored in the secondary storage apparatus 16102 are read by the loader 16122 and are loaded into the main storage 16107 via the resource/security management unit 16123 and the storage management unit 16106. The processing then proceeds to S2022, where a header part (see FIG. 7) of one of the program objects in the program object data part of the package object is read. In the package object, program objects are stored in descending order of priority, and the header part of each program object is read in that order. The processing then proceeds to step S2023, where the priority is read from the header part read in step S2022. As described above, the priority has a value which is "0", "1", "2", or "3". Here, data with the priority value "3" are urgent programs or programs which the broadcast center wants every viewer to see.

In step S2024, it is judged whether the priority read in step S2023 is "3", and, if not, the processing advances to step S2025 where it is judged whether the read of the header parts for the header parts of the other program objects which compose the package objects has been completed. When there are program objects whose header is yet to be read, the processing returns to step S2022 so that the processing thereafter can be repeated.

When it is judged in step S2024 that the read priority is "3", the processing advances to step S2026 where a prioritized player object is generated. By doing so, a prioritized player object (whose class is included in the fundamental class library 16121) which forms the basis of the prioritized reproduction process is generated from the main process. This is to say, the required area is reserved in the main storage 16107 in accordance with the class definition in the prioritized player object, and each variable region is arranged within this reserved region. Here, the actual data that corresponds to each variable value is read from the secondary storage apparatus 16102 and is loaded into the main storage 16107, before instantiation is performed. At the same time, other necessary processing, such as an initiation method, is performed. It should be noted here that the data content of the various media that are required at the time of display/reproduction has a substantial data amount, and so is read from the secondary storage apparatus 16102 not during the instantiation process, but later when the display/reproduction method is performed. After this, the processing advances to step S2027, where a set message is outputted to the timer process. As described later in this text, programs with the priority "3" are set so as to be automatically displayed with a predetermined interval. Here, a timer process performs the setting of the time interval for automatically displaying a program with a priority "3" when a set message has been received from the main process. The processing then advances to step S2028 where the reproduction process generation process is performed. After this, the processing returns from step S2028 to step S2025.

In step S2025, it is determined whether there is a program object in the program object data part of the package object whose header part has not been read. If such a program object remains, the processing returns to step S2022 and the processing described above is repeated so that the header part is read.

When it has been determined in step S2025 that the read of the header part has been performed for all of the program objects included in the package object, the processing advances to step S2029 where the program selection menu display process is executed. This is to say, the intermediate code interpreter 16125 controls the display/reproduction management unit 16110 and has the program selection menu displayed on the display device 16013. This program selection menu is a display for selecting a program in accordance with a default machine program or for selecting a program in accordance with a program selection method (user object) that has been defined by the user. The user manipulates the input device 16015 that enables the interactive functioning to be made and selects one of the two choices given above, so that a program is selected according to a default or to a program selection method defined by the user. When the default is used, each program object is reproduced in order in accordance with their priorities. On the other hand, when a user-defined selection is made, programs are only displayed in accordance with user selections so that, for example, should the user give an indication for "drama", only drama programs will be reproduced out of the program objects received by the digital broadcast reception apparatus.

The processing then advances to step S2030 where it is judged whether the reproduction queue is empty. If this is not the case, such as when there is an object with the priority "3" described above, then in the reproduction process generation process of step S2028 a predetermined reproduction process ID will have been set in the reproduction queue by the reproduction queue setting process, so that the reproduction queue will not be empty. In this case, the reproduction queue evaluation process will be performed in step S2037. Here, it is first judged whether there is a reproduction process that is currently being reproduced. When there is a reproduction process that is currently being reproduced, it is judged whether the priority of the reproduction process which is at the front of the reproduction queue (which is to say, the reproduction process that is scheduled to be reproduced next) is higher than the priority of the reproduction process that is currently being reproduced. When there is a program with the priority "3", the ID of the reproduction process with the priority "3" is set at the front of the reproduction queue. As a result, when the reproduction process that is currently being reproduced as a priority that is "2" or below, a cancellation message will be issued for the reproduction process that is being reproduced. When a reproduction process receives a cancellation message from the main process, the allocation of processing time for reproduction will be set at 1/20 of its present value.

After this, the reproduction queue setting process is performed. In more detail, the priority of the reproduction process that is currently being reproduced is evaluated and the ID of the reproduction process that is currently being reproduced is set at appropriate position in the queue for the evaluation. To execute the processing (reproduce) for a reproduction process, it is necessary to set the ID of the reproduction process in the reproduction queue, although once the reproduction process has been commenced, the ID of the reproduction process will be deleted from the reproduction queue. As a result, for a reproduction process that has been canceled (which is to say, a reproduction process whose allocation of display processing time has been reduced), recommencement of the reproduction process (which is to say, the return of the allocation of the standard display processing time) is only possible if the ID of the presently reproduced reproduction process (which is to say, the reproduction process that is being reproduced with a low display speed) is set once again into the reproduction queue. In this way, when the reproduction queue setting process has been completed, or when it is judged that there is no reproduction process that is currently being reproduced, an activate message is outputted to the reproduction process at the front of the reproduction queue.

When a reproduction process receives an activation message, the reproduction process which is yet to be displayed or which is being displayed with a slow rate is set as being displayed at the standard rate and the ID of the reproduction process that outputted the activation message is deleted from the reproduction queue. When the priority of the reproduction process at the front of the reproduction queue is judged to be equal to or below the priority of the reproduction queue that is currently being reproduced, the reproduction process that is being reproduced is given priority, so that no particular processing is executed.

When it has been judged in step S2030 that the reproduction queue is empty or when the reproduction queue evaluation process has been completed in step S2037, the processing advances to step S2031 where it is judged whether the timer has given an alarm. This is to say, once a set message has been outputted from the main process to the timer process and the timer has measured a predetermined period, the timer outputs an alarm message to the main process. By doing so, an alarm message is outputted to the main process by the timer process. This process is to show that a time for cyclically (with a predetermined interval) displaying a program with the priority "3" has been reached. When such a message has been outputted, the processing advances from step S2031 to S2038 where the reproduction queue setting process is performed for the reproduction process ID which issued the alarm. The ID of the reproduction process for which the alarm was issued (in other words, the ID of the reproduction process with the priority "3") is evaluated and the ID of this reproduction process is set at a suitable position in the reproduction queue. Since the priority of this reproduction process is "3", its ID will generally be moved forward in the reproduction queue.

When it is judged in step S2031 that no alarm has been received from the timer, or that the reproduction queue setting process in step S2038 has been completed, the processing advances to step S2032 where it is judged whether the user has selected a program from the program selection menu that was displayed in step S2029. When it is judged that the user has selected a program whose reproduction is desired, the processing advances to step S2039, where a player object is generated. After this, the processing advances to step S2040 where the reproduction process generation process is performed. In more detail, a new reproduction process is generated based on the player object generated in step S2039 and the reproduction queue setting process is executed. The priority of the generated reproduction process is evaluated and the ID of this reproduction process is set at a position in the queue corresponding to its priority. By doing so, the ID of the reproduction process corresponding to the player object selected by the user is set into the reproduction queue.

When it is judged in step S2032 that the user has not made a selection indication of a program, or when the reproduction process generation process of step S2040 has been completed, the processing advances to step S2033 where it is judged whether the user has given a pause indication. When the user has given a pause indication, the processing advances to step S2041 where a pause message is outputted to the reproduction process in question. This is to say, a pause message is outputted from the main process to the reproduction process.

When a reproduction process receives a pause message, the reproduction process that is being displayed at the standard speed is paused. This corresponds to the case where the user pauses a program midway before the program has ended, so that to enable the reproduction of the program to be recommenced from the midway point, the processing advances to step S2042 where the reproduction queue setting process is executed. This is to say, the reproduction queue set in order to make the recommencement of the reproduction of the currently reproduced reproduction process possible.

When it is judged in step S2033 that the user has not given a pause indication, or when the reproduction queue setting process of step S2042 has been completed, the processing advances to step S2034 where it is judged whether the user has given an end program indication. When the user has given an end program indication, the processing advances to step S2043 where an end message is outputted to the reproduction process in question. In more detail, an end message is outputted to the reproduction process by the main process. On receiving an end message, a reproduction process that has the priority "3" will have the reproduction processing as a whole completed. The processing will advance from step S2043 to S2044 and, after the required post-processing A which includes the clearing of the memory that activated the reproduction process (although the clearing of the memory will not yet be performed if the priority of the reproduction process is "3"), the processing advances to step S2036. It should be noted here that when the user has indicated the end of a program, this differs from a pause midway through the program and so the processing for resetting the currently reproduced reproduction process back into the reproduction queue is not performed.

When the user is judged in step S2034 to have not given an end program indication, the processing advances to step S2035 where it is judged whether an end message has been received from a reproduction process. When program reproduction has ended, a reproduction process with a priority "3" outputs an end message. This is to say, an end message is outputted from the reproduction process to the main process. When the main process has received an end message in step S2035, the processing advances to step S2045 and after the required post-processing B has been performed (which here is the clearing of the memory for the reproduction process with the priority "3"), the processing advances to step S2036.

When the main process is judged in step S2035 to have not received an end message from a reproduction process, or when with either the post-processing A in step S2044 or the post-processing B in step S2045 has been completed, the processing advances to step S2036 where it is judged whether there has been an indication for the end of viewing. If not, the processing returns to step S2030 and the processing in the following steps is repeated. Conversely, when it is judged that there has been an end of viewing indication in step S2036, the processing advances to step S2046 where the end processing is performed to end the reproduction processing.

This completes the description of how data processing is performed in a conventional digital broadcasting system.

Conventional digital broadcast systems have had a drawback in that when a computer program that is required for the realization of interactive operations for a program is transmitted by the digital broadcast transmission apparatus, the conventional digital broadcast reception apparatus described above will not be able to commence the execution of the computer program used by a program until the computer program has been received in its entirety. This is because when execution is commenced while receiving a computer program, abnormal operations can occur when trying to execute a part of the computer program which is yet to be received.

As a result of the situation described above, there is the problem that interactive programs are unresponsive to user operations and changes in the state of the program.

As a method to improve responsiveness, the reception apparatus for a digital broadcast may be provided with a large-scale storage apparatus so that computer programs can be received and stored in advance.

However, when considering the supply of digital broadcasts to a wide variety of digital broadcast reception apparatuses that have a wide variety of processing capabilities, it is undesirable to make a large-capacity storage apparatus a requirement for a digital broadcast reception apparatus. Also, since the content of digital broadcasts can change over time, it is undesirable to have data received in advance.

As a different problem, when a conventional digital broadcast transmission apparatus wishes to have each digital broadcast reception apparatus execute a process in accordance with the processing level of the digital broadcast reception apparatus (which varies between a low level and a high level), the conventional digital broadcast transmission apparatus has to generate a separate program for each processing level of the digital broadcast reception apparatuses and to transmit a single program that includes all of the processes for the different processing levels of the digital broadcast reception apparatuses.

However, of the two methods described above, the former has the drawbacks that it is necessary to generate a plurality of programs and that the transmission of the plurality of programs represents a considerable load. The latter method has the drawback that each digital broadcast reception apparatus has to receive processes that do not correspond to the processing level of the digital broadcast reception apparatus, so that inefficient use is made of the storage apparatus included therein.

DISCLOSURE OF THE INVENTION

In view of the stated problems, it is a first object of the present invention to provide a digital broadcast reception apparatus that can start execution having only received a program in part, and to provide digital broadcast transmission apparatus that makes this possible.

It is a second object of the present invention to provide a digital broadcast reception apparatus that can perform appropriate processing for its processing level without increasing the burden of program generation or transmission, and without inefficiently using a storage apparatus, as well as providing a digital broadcast transmission apparatus that makes this possible.

To achieve the stated first object, the present invention is a program reception execution apparatus that receives and executes a program, the program having been transmitted by a program transmission apparatus after being divided into a plurality of partial programs that each include a set of next partial program information which shows what partial program should be executed following a present partial program, the program reception execution apparatus including: a storage unit including a program storage area; a reception unit for receiving the plurality of partial programs and storing the plurality of partial programs in the storage unit; and an execution control unit for executing the plurality of partial programs that are stored in the storage unit, the execution control unit including: a program presence judgement unit for judging whether an indicated partial program is stored in the storage unit; a program preparation unit (1) for referring to a set of next partial program information, for indicating, when a first partial program is being executed and a second partial program is to be executed next, the second partial program based on the set of next partial program information, and for having the program presence judgement unit judge whether the second partial program is stored in the storage unit, (2) for preparing for an execution of the second partial program when the program presence judgement unit has judged that the second partial program is present, (3) for waiting and not allowing an execution of the program to advance when the program presence judgement unit has judged that the second partial program is not present, and for preparing for an execution of the second partial program when the program presence judgement unit judges that the second partial program is present; and a program execution unit for executing a plurality of instructions in a partial program whose execution has been prepared by the program preparation unit and for activating the program preparation unit.

With the stated construction, when a program is transmitted having been divided into a plurality of partial programs, the execution of a required partial program can commence as soon as the partial program has been received. When execution control needs to proceed from a present partial program to another partial program, this other partial program can be executed if it has already been received, with the execution of a plurality of partial programs being possible in the same way thereafter. As a result, the object program can be executed without needing to be received in its entirety, meaning that program execution can commence quickly.

Here, each set of next partial program information may include an identifier for identifying a partial program that is to be executed following a partial program that includes the set of next partial program information, the reception unit may include a separation extraction unit for separating and extracting an indicated partial program from a received signal using the identifier in a set of next partial program information, and the execution control unit may further includes a program extraction indicating unit for instructing the separation extraction unit to separate and extract a partial program and to store the partial program in the storage unit when the program presence judgement unit has judged that the partial program is not present in the storage unit.

With the stated construction, the program reception execution apparatus can extract only the required partial program, store it in the storage apparatus and execute it, meaning that a program reception execution apparatus that efficiently uses its storage capacity can be realized.

Here, each set of next partial program information may include a link instruction that is an instruction indicating an execution of another partial program after a present partial program, and the program execution unit may include: a link instruction judgement unit for judging whether an instruction to be executed in a present partial program is a link instruction; and a link instruction processing unit for activating the program preparation unit when the link instruction judgement unit has judged that the instruction to be executed is a link instruction.

With the stated construction, it is easy to inform the execution control unit that a next partial program is required for the continuation of the execution of the partial programs.

Here, at least one set of next partial program information includes (a) a selective link instruction that is an instruction indicating that one out of a plurality of next partial programs is to be executed in accordance with a function level of the program reception execution apparatus, and (b) a base identifier that is information which provides a base for combining an identifier of one out of the plurality of next partial programs, the program reception execution apparatus further including a function level storage unit for storing a function level of the program reception execution apparatus, and the program execution unit may further includes: a selective link instruction judgement unit for judging whether an instruction to be executed in a present partial program is a selective link instruction; and a selective link instruction processing unit which, when the link instruction judgement unit has judged that the instruction is a link instruction, refers to the base identifier and the function level stored in the function level storage unit and combines the base identifier and the function level to produce an identifier for the partial program to be executed, before activating the program preparation unit.

The stated construction can achieve the stated second object of the present invention, so that the program reception execution apparatus can select one partial program that performs processing in accordance with the processing level of the program reception execution apparatus, meaning that optimal processing is performed by the program reception execution apparatus.

Here, each partial program may be composed of bytecodes that are intermediate code which is independent of an execution environment, and the program execution unit may successively interpret and execute one bytecode at a time in a partial program.

With the stated construction, since it is possible to obtain a next partial program when interpreting an instruction that shows a next partial program is necessary for the continuation of the processing of the partial programs, unnecessary partial programs do not need to be written into the storage apparatus, so that the program reception execution apparatus can execute a program without inefficiently using its memory capacity.

Here, the program reception execution apparatus may further include: an event information management unit for storing a correspondence table which associates a plurality of user operations with an identifier of an initial partial program that should be executed corresponding to each respective user operation; and an event processing unit for obtaining the identifier of an initial partial program that should be executed corresponding to a user operation from the event information management unit, and for instructing the separation extraction unit to separate and extract the initial partial program and to store the initial partial program in the storage unit, before having the execution control unit execute the initial partial program when the program presence judgement unit has judged that the initial partial program has been stored in the storage unit.

With the stated construction, partial programs can be executed in response to a variety of events that can be caused by user operations or by the processing of the components, so that the processing corresponding to the events can be commenced at high speed.

Here, the program reception execution apparatus may further include: an error processing information management unit for storing a correspondence table that associates each error which occurs during program execution with error codes that show what error processing should be executed for each respective error; and an error processing unit for obtaining from the error processing information management unit the error code showing the error processing that should be executed corresponding to an occurrence of an error, and, when the error code indicates an activation of a partial program, for instructing the separation extraction unit to separate and extract the partial program and to store the partial program in the storage unit, before having the execution control unit execute the partial program when the program presence judgement unit has judged that the partial program has been stored in the storage unit.

With the stated construction, error processing can be commenced at high speed by performing a partial program that corresponds to the error occurrence.

Here, the program reception execution apparatus may receive and execute a plurality of partial programs that have been sent by a digital broadcast transmission apparatus.

With the stated construction, a program reception execution apparatus can receive and execute a plurality of partial programs transmitted by a digital broadcast transmission apparatus.

Here, the program reception execution apparatus may receive and execute a plurality of partial programs that have been repeatedly sent by a digital broadcast transmission apparatus.

With the stated construction, when the plurality of partial programs which are repeatedly transmitted are received and executed by a program reception execution apparatus, the program reception execution apparatus is able to delete executed partial programs from the storage device when they are no longer needed, since the partial programs can be received and stored again in the storage device when necessary. This means that very effective use of the storage device is made.

Here, the plurality of partial programs are transmitted by being multiplexed with at least one of image data and audio data.

With the stated construction, a partial program that controls images and audio can be executed so that control processing related to images and audio can be commenced at high speed.

Here, the program reception execution apparatus may conform to ISO/IEC 13818 Standard, and the plurality of partial programs may be transmitted by being arranged into at least one part of a private section in an MPEG2 transport stream that conforms to ISO/IEC 13818 Standard.

With the stated construction, the program reception execution apparatus can use the PID and table ID taken from the received signal to easily separate the partial programs using a transport decoder.

Here, the execution control unit may further include a transmission request transmitting unit which, when the program presence judgement unit has judged that a partial program is not stored in the storage unit, transmits a request for a transmission of the partial program to a program transmission apparatus.

With the stated construction, the program reception execution apparatus is able to delete an executed partial program from a region of the storage device when the partial program is no longer needed, since the partial program can be received and stored again in the storage device when necessary by transmitting a transmission request to a program transmission apparatus. This means that very effective use of the storage device is made.

Here, the storage unit may further include a memory management unit which, when there is insufficient free space in the program storage area for storing a new partial program, performs control to delete at least one partial program that is already present in the program storage area to generate free space into which the new partial program is written, the program execution unit may further include: a lock instruction judgement unit for judging whether an instruction to be executed in a present partial program is a lock instruction which indicates that the present partial program should not be deleted; and a lock instruction notification unit which, when the lock instruction judgement unit judges that the instruction is a lock instruction, sends common partial program identification information to the memory management unit to show that the present partial program includes a lock instruction, and the memory management unit may perform control so that partial programs that have been indicated by the common partial program identification information sent from the lock instruction notification unit are not deleted.

With the stated construction, the program reception execution apparatus can ensure that specified partial programs are not deleted from the storage device, so that when a specified partial program becomes necessary again during the execution of the program, the program reception execution apparatus can quickly commence the execution of the specified partial program.

The program transmission apparatus of the present invention is a program transmission apparatus for transmitting a program to a program reception execution apparatus, including: a storage unit for storing the program beforehand; a dividing unit for dividing the program stored in the storage unit into a plurality of partial programs; an identifier assigning unit for assigning a different identifier to each of the partial programs generated by the dividing unit to identify each of the partial programs; and a transmission unit for transmitting the plurality of partial programs.

With the stated construction, a program reception apparatus is able to start execution on receiving a required partial program, thereby achieving high-speed commencement of execution. This realizes the first object of the present invention.

Here, the program transmission apparatus may further include a next partial program information appending unit for appending a set of next partial program information, showing which partial program is to be executed next, to at least one partial program in the plurality of partial programs, each set of next partial program information including an identifier of the partial program to be executed next.

With the stated construction, the program reception apparatus can extract a required partial program using an identifier, store the extracted partial program in a storage device and execute it. As a result, a program can be executed while making efficient use of storage capacity.

Here, each set of next partial program information may include a link instruction that shows which partial program is to be executed next, and the next partial program information appending unit may include a link instruction generating unit for generating a link instruction at positions in the plurality of partial programs generated by the dividing unit so that processing can proceed to a next partial program.

With the stated construction, the execution control unit in a program reception apparatus can be easily informed of the next partial program that is to be executed by means of link instructions that are inserted into the partial programs.

Here, the program transmission apparatus may further include a program structure information storage unit for storing program structure information showing a branch structure in the program, and the dividing unit may include a branch dividing unit for referring to the program structure information stored in the program structure information storage unit and dividing the program into partial programs in accordance with the branch structure of the program.

With the stated construction, the program transmission apparatus sends each of the plurality of paths in a branch structure of a program as a separate partial program, so that the program reception execution apparatus is able to receive a partial program for only one out of the plurality of paths in the branch structure of the program and to execute the received partial program, meaning that execution can be commenced at high speed.

Here, the program structure information includes information showing a program part where one of a plurality internal processes is selected in accordance with a processing ability of a program reception execution apparatus, and the dividing unit may further include a level-demarcated dividing unit for referring to the program structure information and dividing the program so that each internal process that corresponds to a different processing ability of a program reception apparatus is divided into a separate partial program.

The stated construction realizes the second object of the present invention, and enables the generation of a program with a branch structure which has a program reception execution apparatus perform processing in accordance with its processing level. This makes program generation easy.

Here, the next partial program information appending unit may further include: a selective identifier appending unit for appending a selective identifier to identify each partial program divided by the level-demarcated dividing unit in accordance with the separate internal processes, each selective identifier including a common part for all of the partial programs divided by level-demarcated dividing unit and a unique part which is unique for each partial program in the partial programs divided by level-demarcated dividing unit; and a selective link instruction generation unit for generating a selective link instruction and inserting the selective link instruction at a necessary position in a partial program that needs an execution to proceed to one of the plurality of partial programs that have been divided by the level-demarcated dividing unit in accordance with the separate internal processes, the selective link instruction being an instruction that has a program reception apparatus proceed to one of the plurality of partial programs divided by level-demarcated dividing unit in accordance with a processing ability of the program reception apparatus.

With the stated construction, a program reception execution apparatus is able to selectively receive and execute one out of a plurality of partial programs in accordance with its processing level, meaning that the program reception execution apparatus is able to execute optimal processing for its processing level without making inefficient use of the storage apparatus.

Here, the link instruction may have an operand that is an identifier which identifies a partial program which is required next.

With the stated construction, the program reception execution apparatus can easily obtain the identifier of a next partial program which is required for the continuation of the execution of the program.

Here, the selective link instruction may have an operand that is a base operand for identifying a partial program which is required next, the base operand being an operand that provides information for the common part of each selective identifier assigned to the plurality of partial programs by the selective identifier appending unit, so that processing proceeds in accordance with the processing ability of the program reception apparatus.

With the stated construction, a program reception execution apparatus is able to selectively receive and execute one out of a plurality of partial programs in accordance with its processing level, with it being easy to generate the identifier of the partial program to be received from the received information.

Here, the dividing unit may divide the program into partial programs so that each partial program is no larger than a predetermined size.

With the stated construction, a program reception execution apparatus is able to receive a partial program that is equal to or below a predetermined size, so that execution can be commenced at high speed.

Here, the predetermined size may be a size of a packet that is a smallest transmission unit for continuously transmitting sets of data.

With the stated construction, a program reception execution apparatus is able to extract and execute a partial program with the smallest possible size that can be extracted, meaning that execution can be commenced even faster.

Here, the transmission unit may transmit the plurality of partial programs as a digital broadcast.

With the stated construction, the program can be simultaneously transmitted to a large number of program reception execution apparatuses.

Here, the transmission unit may repeatedly transmit the plurality of partial programs.

With the stated construction, the program reception execution apparatus is able to delete an executed partial program from a region of the storage device when the partial program is no longer needed, since the partial program can be received and stored again in the storage device when necessary. This means that the very effective use of the storage device is made.

Here, the plurality of partial programs may form at least one part of error processing for the program.

With the stated construction, the program reception execution apparatus can commence error processing at high speed.

Here, the program transmission apparatus may further include an image audio data storage unit for storing at least one of image data and audio data beforehand, and the transmission unit may multiplex the plurality of partial programs with any image data and audio data stored in the image audio data storage unit and transmit a multiplexing result.

With the stated construction, the program reception execution apparatus can execute a partial program that controls images or audio, so that control processing relating to images or audio can be commenced at high speed.

Here, the transmission unit may arrange the plurality of partial programs into at least part of a private section of an MPEG2 transport stream in conformity with ISO/IEC 13818

Standard, and performs multiplexing and transmission in conformity with the ISO/IEC 13818 Standard.

With the stated construction, a program reception execution apparatus can use a table ID as an identifier of a partial program, so that the program reception execution apparatus can use the PID and table ID taken from the received signal to easily separate the partial programs using a transport decoder.

Here, the program transmission apparatus may further include a transmission request reception unit for receiving a transmission request, including partial program indicating information, that has been sent by a program reception apparatus, the transmission unit further including a request response transmission unit for referring, when a transmission request has been received by the transmission request reception unit, to the partial program indicating information in the transmission request and transmitting a partial program in accordance with the transmission request.

With the stated construction, the program transmission apparatus is able to transmit a partial program having received a transmission request, so that the program reception execution apparatus is able to delete an executed partial program from a region of the storage device when the partial program is no longer needed, since the partial program can be received and stored again in the storage device when necessary by transmitting a transmission request to the program transmission apparatus. This means that very effective use of the storage device is made.

Here, the program transmission apparatus may further includes: a priority assigning unit for assigning a priority to each partial program which is a frequency with which the partial program will be repeatedly transmitted, the transmission unit may repeatedly transmit the partial programs as a digital broadcast, changing an interval at which each partial program is repeatedly transmitted in accordance with the priorities assigned by the priority assigning unit.

With the stated construction, the program reception execution apparatus will be able to reduce the time taken to receive a partial program that is the entrance into a main program, this being the minimum requirement for the execution of the program. As a result, program execution can be quickly commenced, thereby realizing the first object of the present invention.

BRIEF DESCRIPTION OF THE DRAWINGS

FIG. 17 shows the composition of the error processing table and the error process in error processing table, and the error processing codes.

FIG. 18 shows the construction of the default error processing table and the default error process in error processing table.

PREFERRED EMBODIMENTS OF THE PRESENT INVENTION

First Embodiment

The program transmission apparatus and program reception/execution apparatus of the first embodiment of the present invention are described below.

Digital Broadcast Transmission Apparatus

A digital broadcast transmission apparatus will be described first.

The present digital broadcast transmission apparatus is an apparatus which compresses digital image data and digital audio data that compose a broadcast program, program information, and machine programs such as for program control, and then multiplexes and transmits the compressed data. This digital broadcast transmission apparatus conforms to ISO/IEC 13818 standard. The machine programs mentioned here refer to computer programs.

Figure 1:
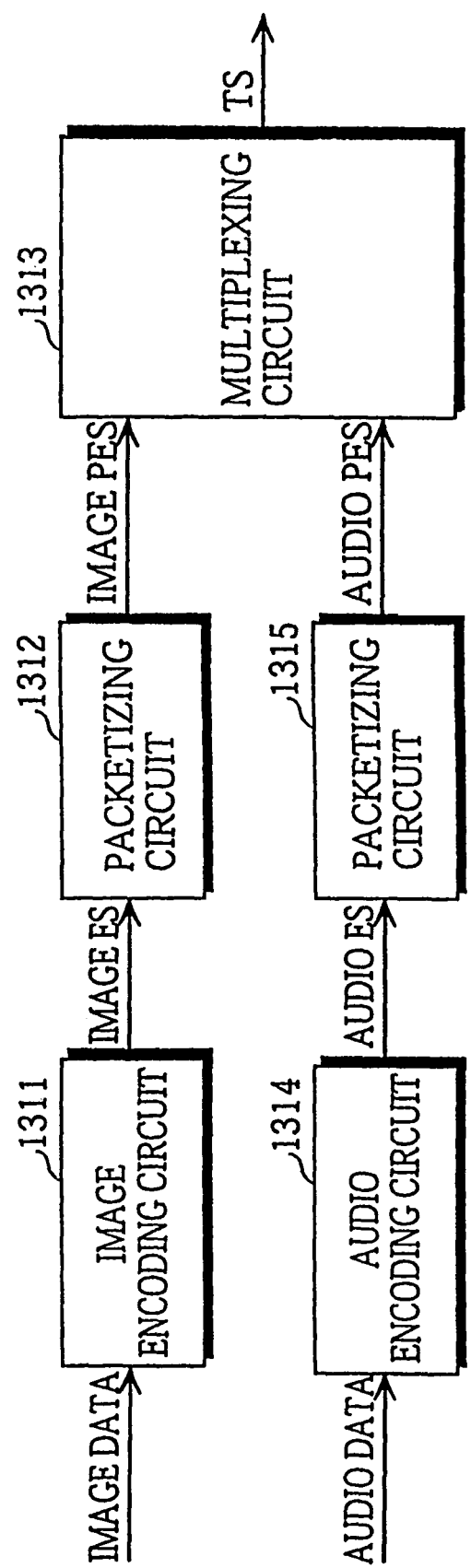
FIG. 1 shows the overall construction for multiplexing bitstreams formed by compressing digital image data and digital audio data.
Figure 2:
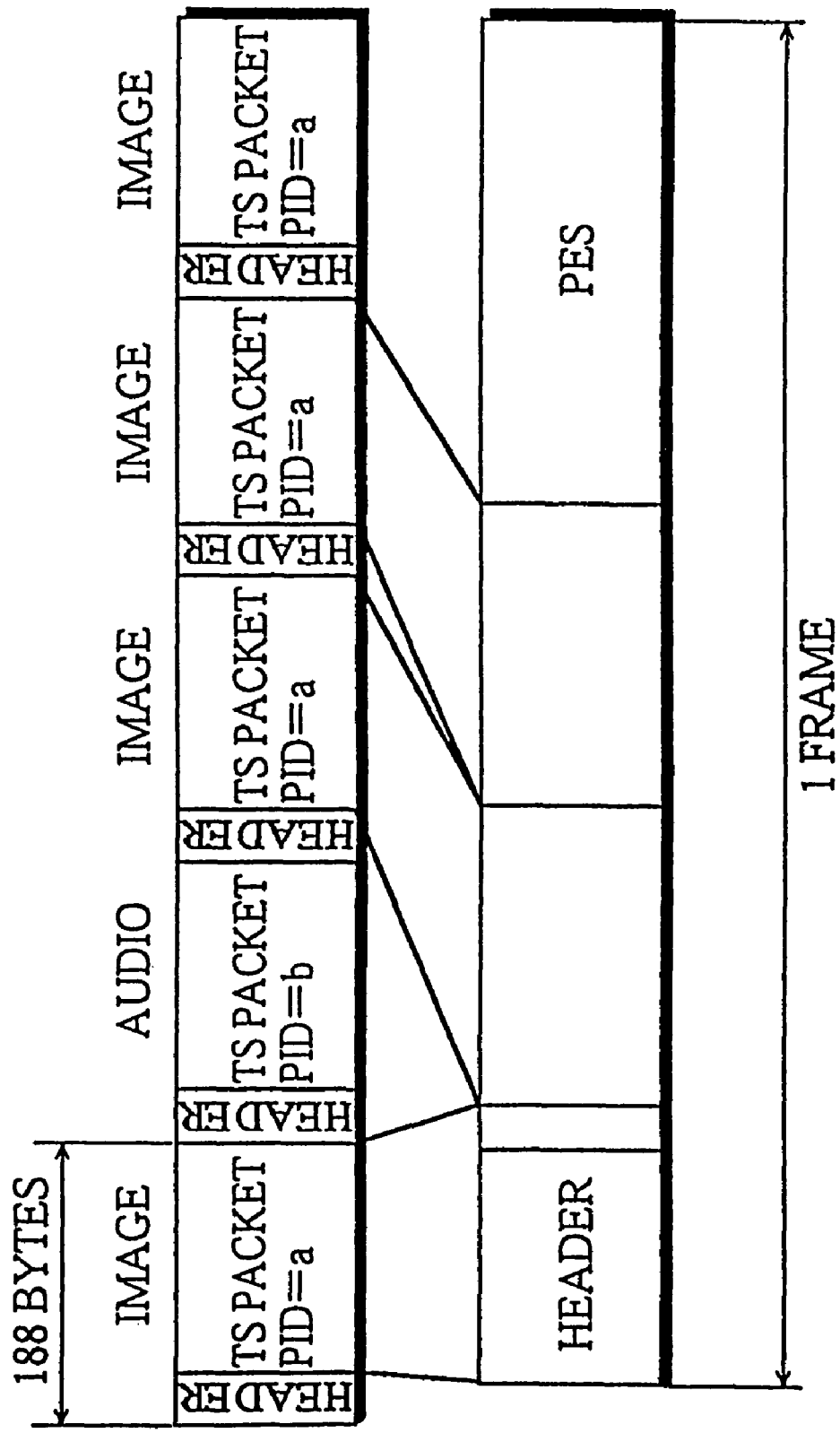
FIG. 2 shows the construction of a PES.
Figure 3:
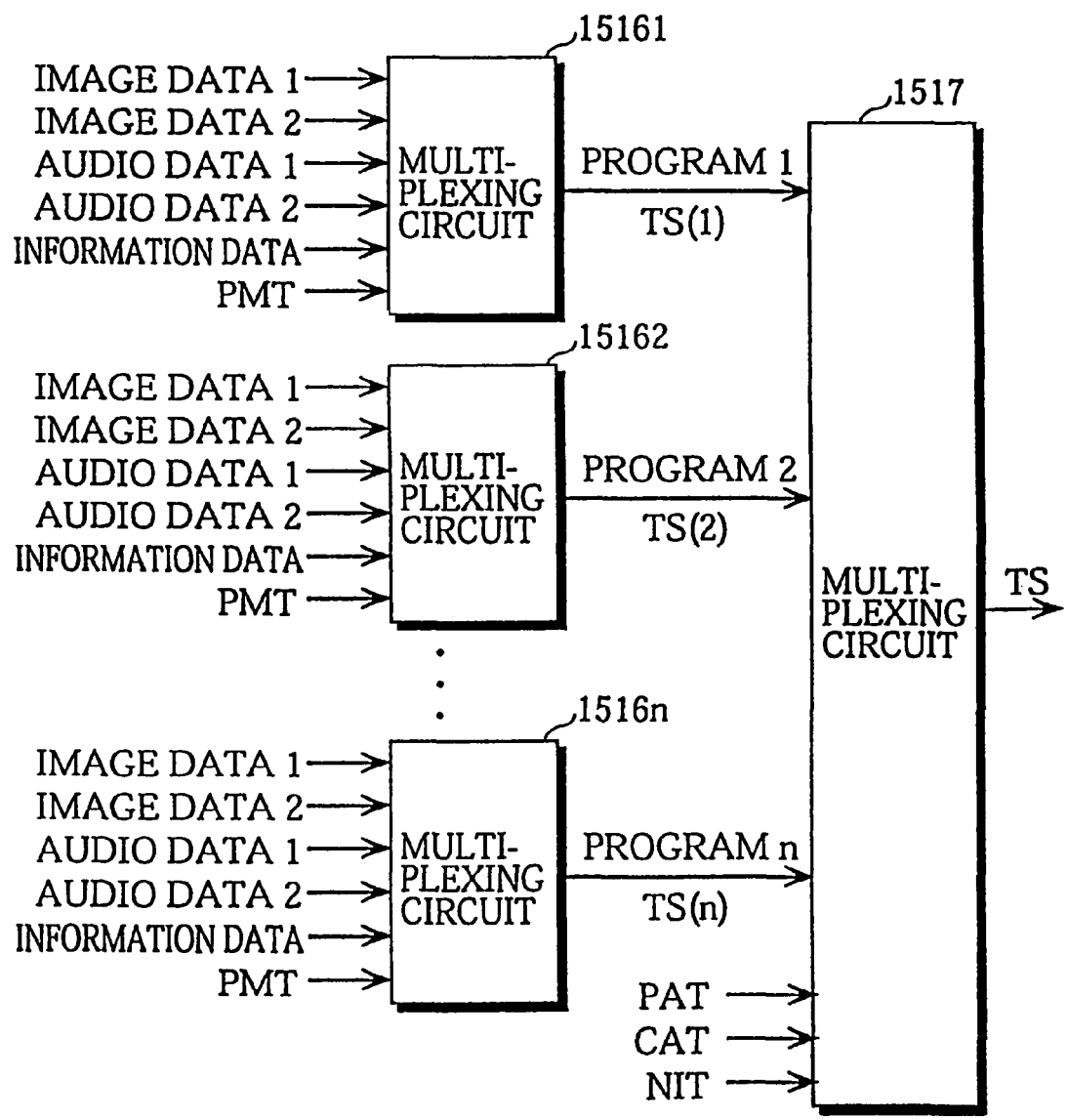
FIG. 3 shows the construction for forming a bitstream for broadcasting purposes.
Figure 4:
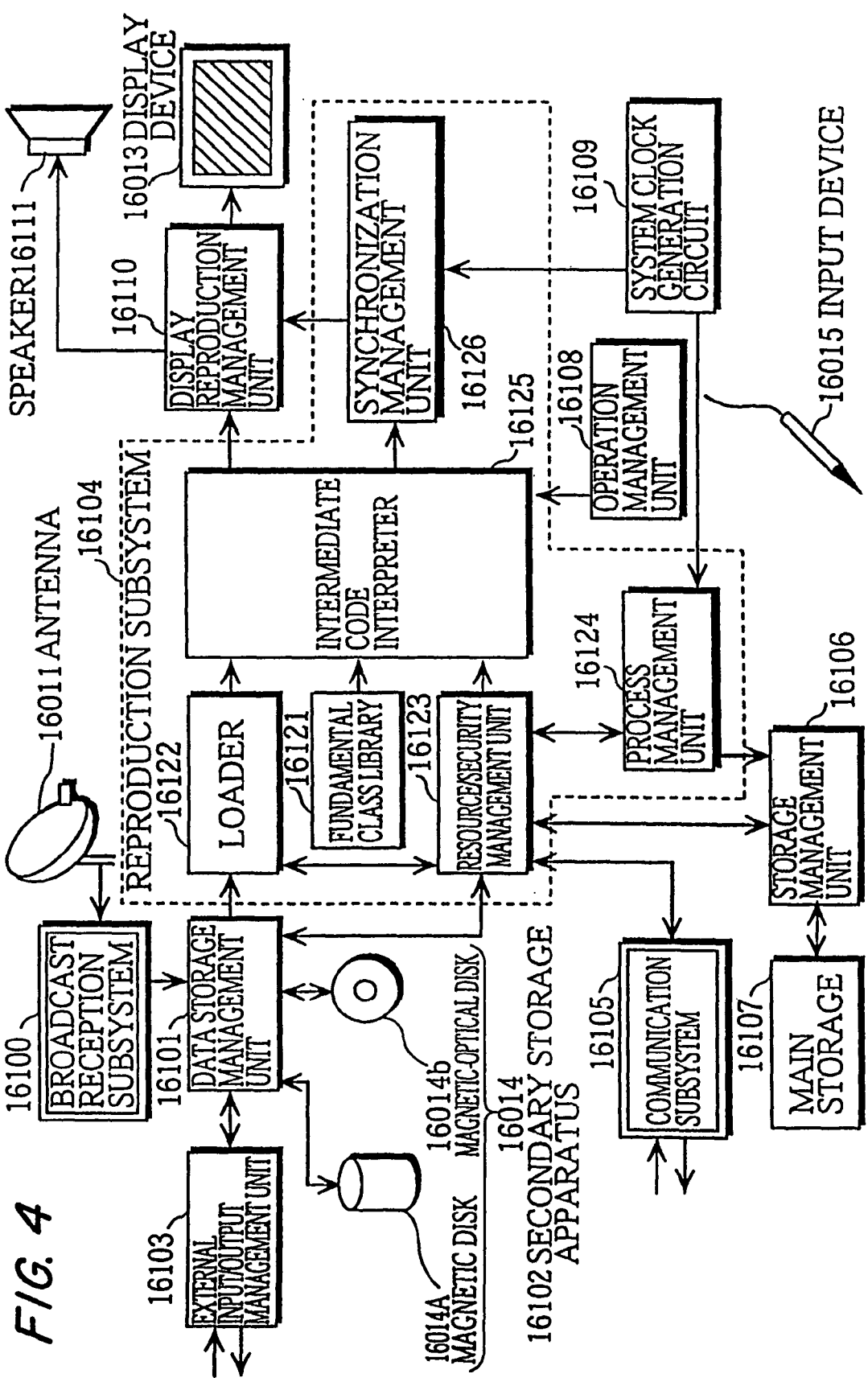
FIG. 4 shows an example configuration of a digital broadcast reception apparatus for use in a conventional digital broadcasting system.
Figure 5:
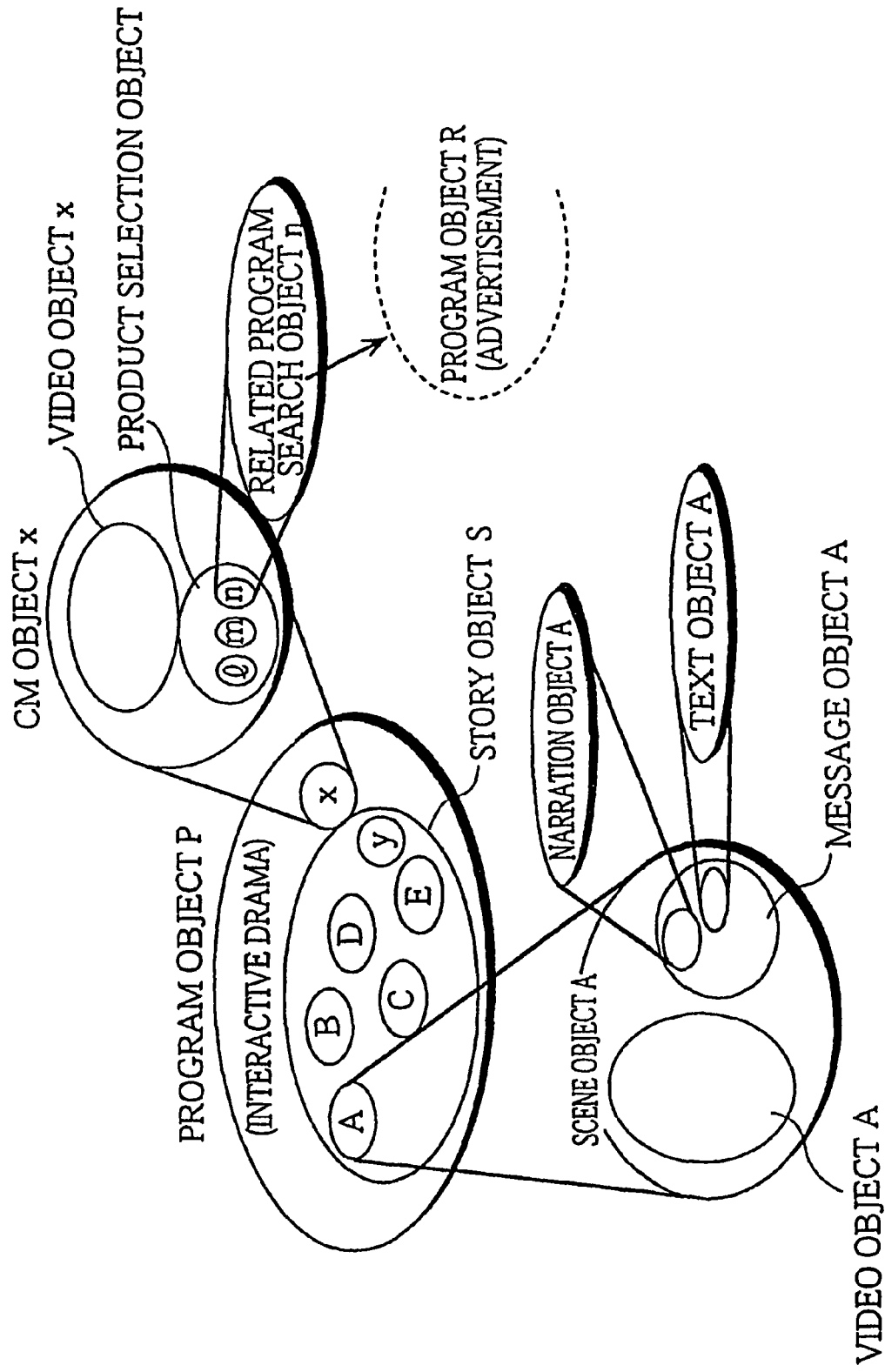
FIG. 5 shows the composition of a program object.
Figure 6:
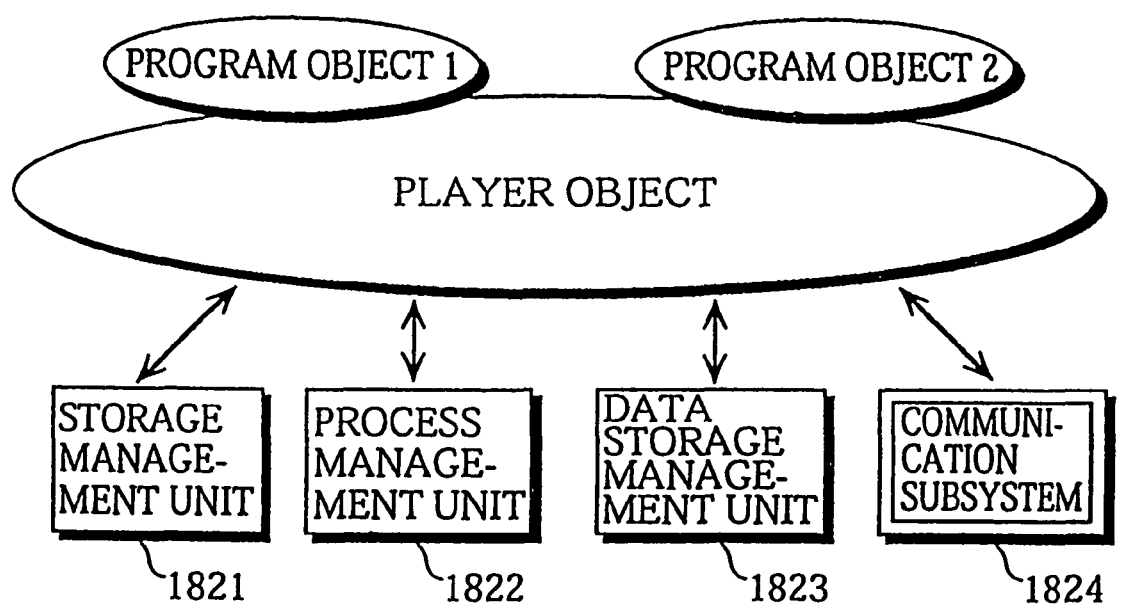
FIG. 6 shows a machine program object that reproduces this kind of program object.
Figure 7:
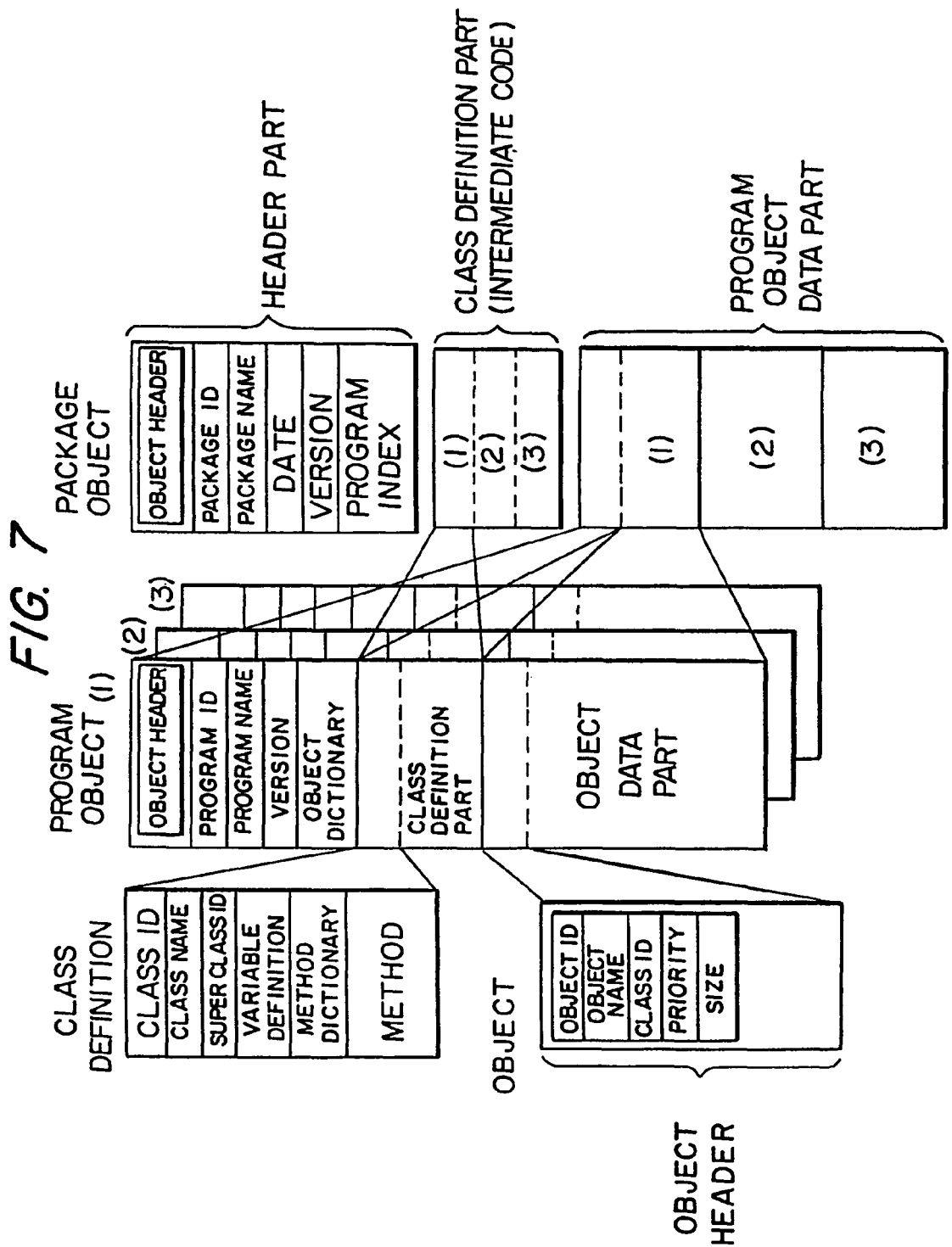
FIG. 7 shows the format of a program object.
Figure 8:
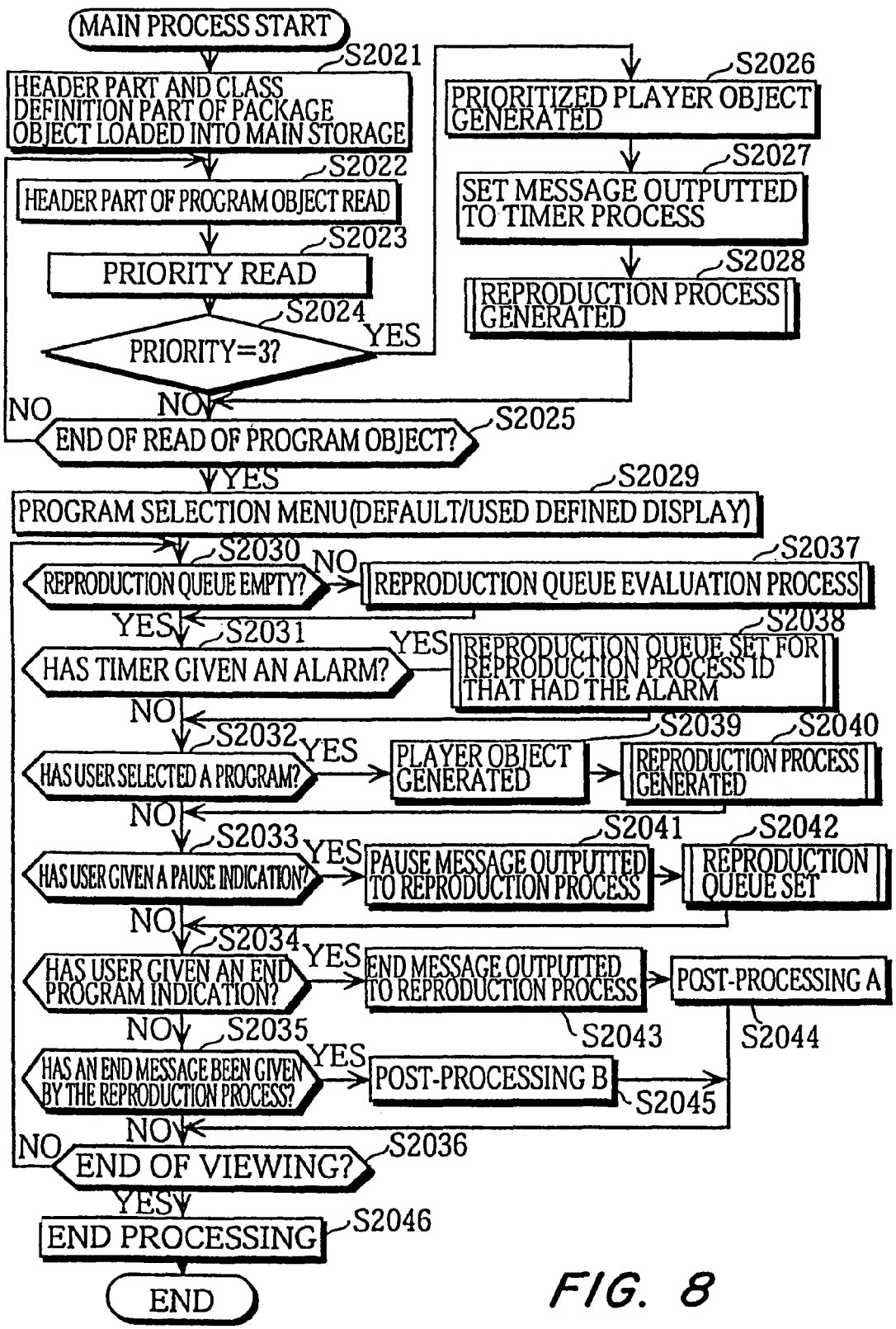
FIG. 8 is a flowchart showing the procedure of the main process of a conventional digital broadcast reception apparatus.
Figure 9:
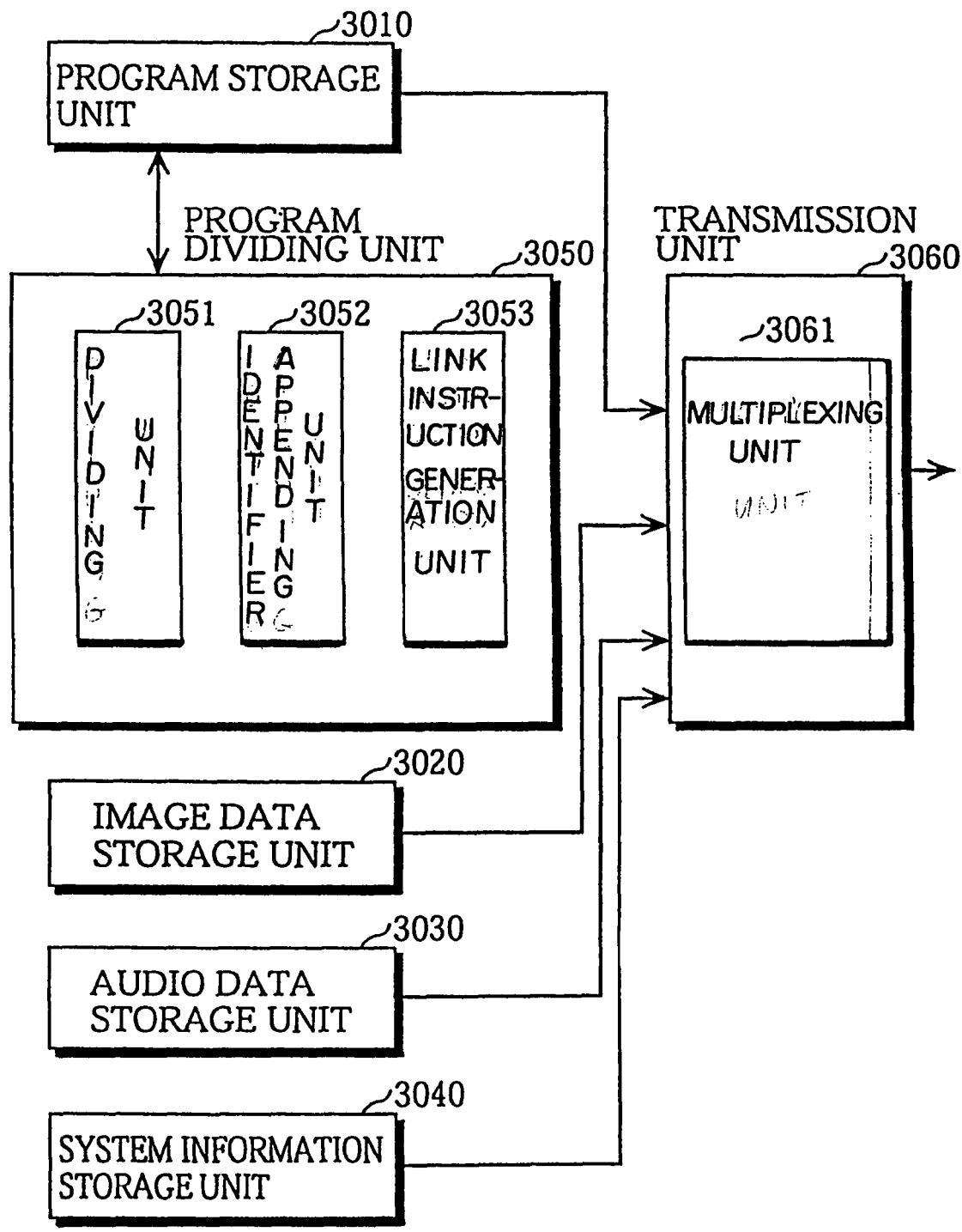
FIG. 9 is a block diagram showing the configuration of the digital broadcast transmission apparatus in the first embodiment of the present invention.

FIG. 9 is a block diagram showing the configuration of the digital broadcast transmission apparatus in the first embodiment of the present invention.

The program storage unit 3010 stores information for broadcast programs and a machine program which is used for broadcast program control. The image data storage unit 3020 stores image data that composes the broadcast programs. The audio data storage unit 3030, meanwhile stores the audio data that composes the broadcast programs. The system information storage unit 3040 stores system information that is information for extracting image data, audio data, information for broadcast programs, and the machine program.

The program dividing unit 3050 divides the machine programs. Hereafter, the parts of a machine program that result from this division will be referred to as "partial programs".

The program dividing unit 3050 includes a dividing unit 3051 which divides the machine program stored in the program storage unit 3010, an identifier appending unit 3052 for appending each of the divided parts of the program with information for identifying each partial program, and a link instruction generation unit 3053 for writing link instructions, which are control transfers to another partial program, into the partial programs.

The transmission unit 3060 has the multiplexing unit 3061 convert the information for the broadcast programs and the plurality of partial programs in the program storage unit 3010, the image data in the image data storage unit 3020, the audio data in the audio data storage unit 3030, and the system information in the system information storage unit 3040 into transport streams under MPEG2, multiplexes the transport streams, and transmits the result.

It should be noted here that the program storage unit 3010, the image data storage unit 3020, the audio data storage unit 3030, the system information storage unit 3040 provide the necessary storage for the data corresponding to the programs to be broadcast which has been generated by an external apparatus, so that the content of the broadcasts made by the transmission unit 3060 will change over time. However, in order for control of the program to be possible at the receiver side in a digital broadcast system regardless of the time at which reception is commenced, the transmission unit 3060 will repeatedly transmit the same set of machine programs that are required for broadcast program control during the transmission of the image data and audio data for a single program. This is to say, the content of the program storage unit 3010 which relates to the control of the broadcast program is repeatedly multiplexed with a predetermined interval.

Figure 10:
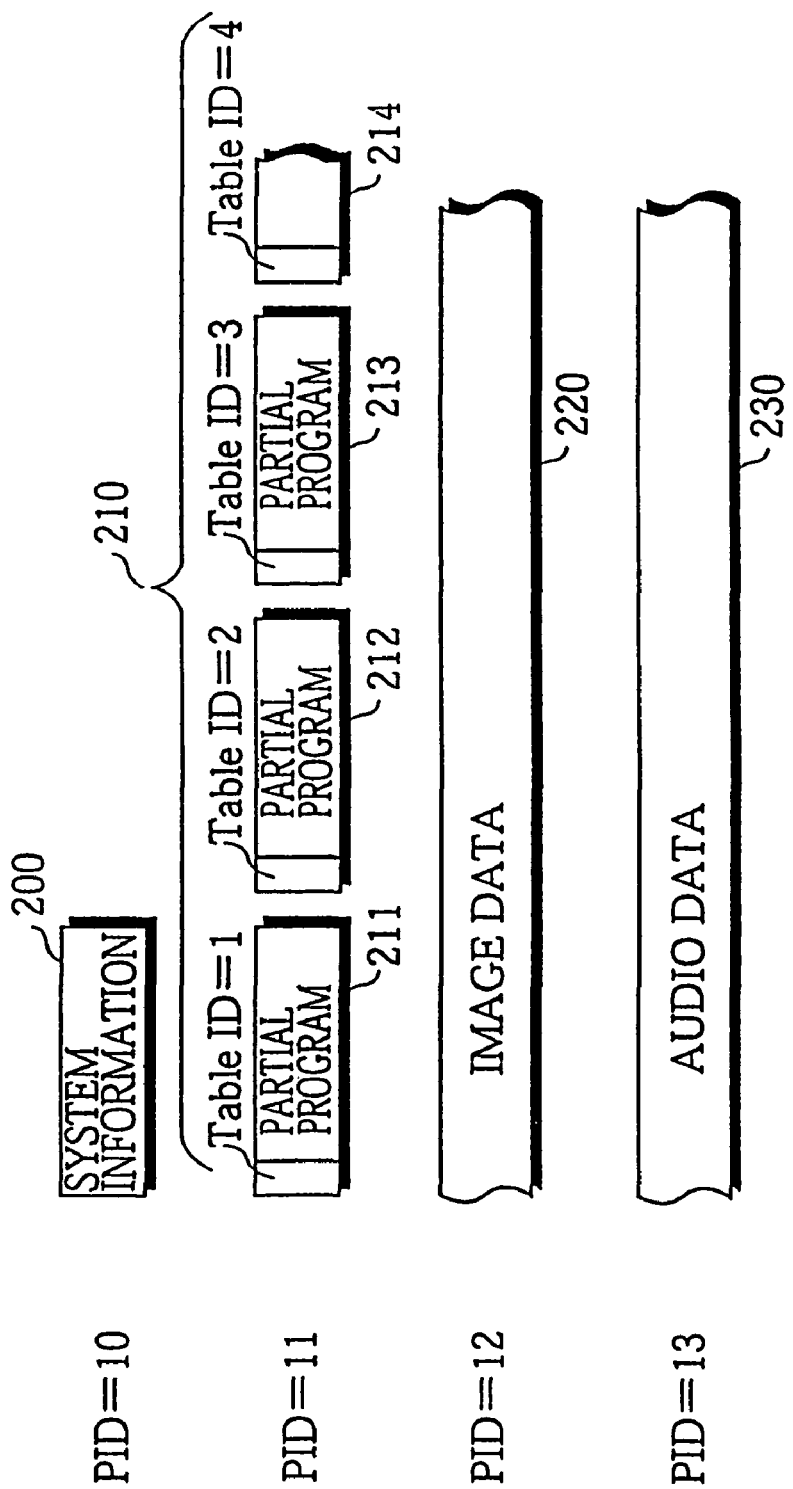
FIG. 10 is a representation of a transport stream.

FIG. 10 is a representation of a transport stream.

In FIG. 10, the system information is shown as the MPEG2 transport stream 200 that has the PID "10", and the plurality of partial programs are shown as the transport stream 210 with the PID "11" where the MPEG2 private sections 211, 212, 213, 214 . . . each have a unique table ID. The image data and audio data are shown as the transport streams 220, 230 which are respectively given the PIDs "12" and "13". It should be noted here that the data for program information and for program control is stored in a private section in the transport stream 210. Here, the abbreviation "PID" stands for "Packet Identifier", and is an identifier that is used for identifying images, audio, and the other kinds of transport stream.

The transport streams 200, 210, 220, and 230 are multiplexed by the multiplexing unit 3061 and are transmitted as a sequence of transport packets that are each 188 bytes in size.

Figure 11:
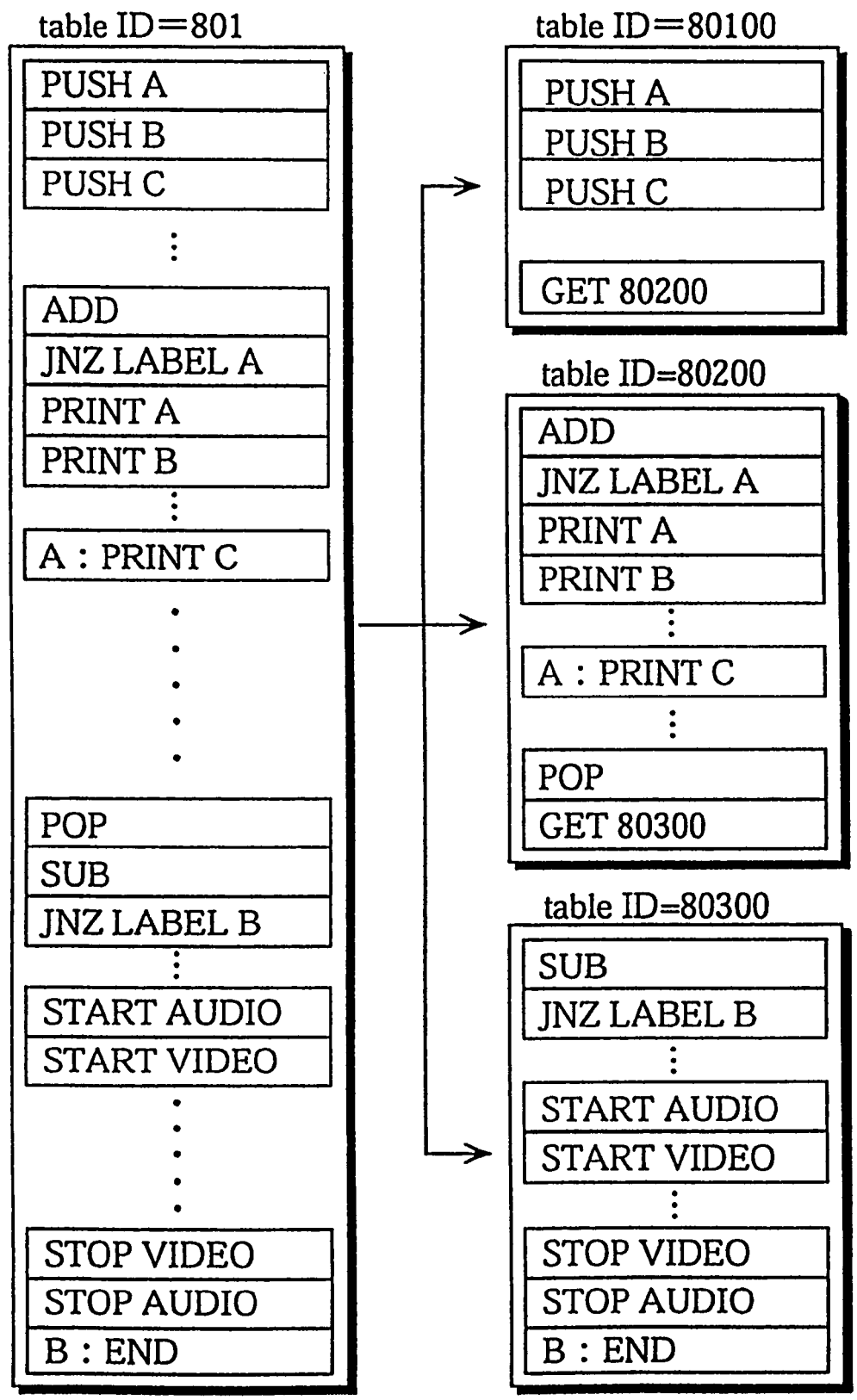
FIG. 11 shows the division of a machine program.
Figure 12:
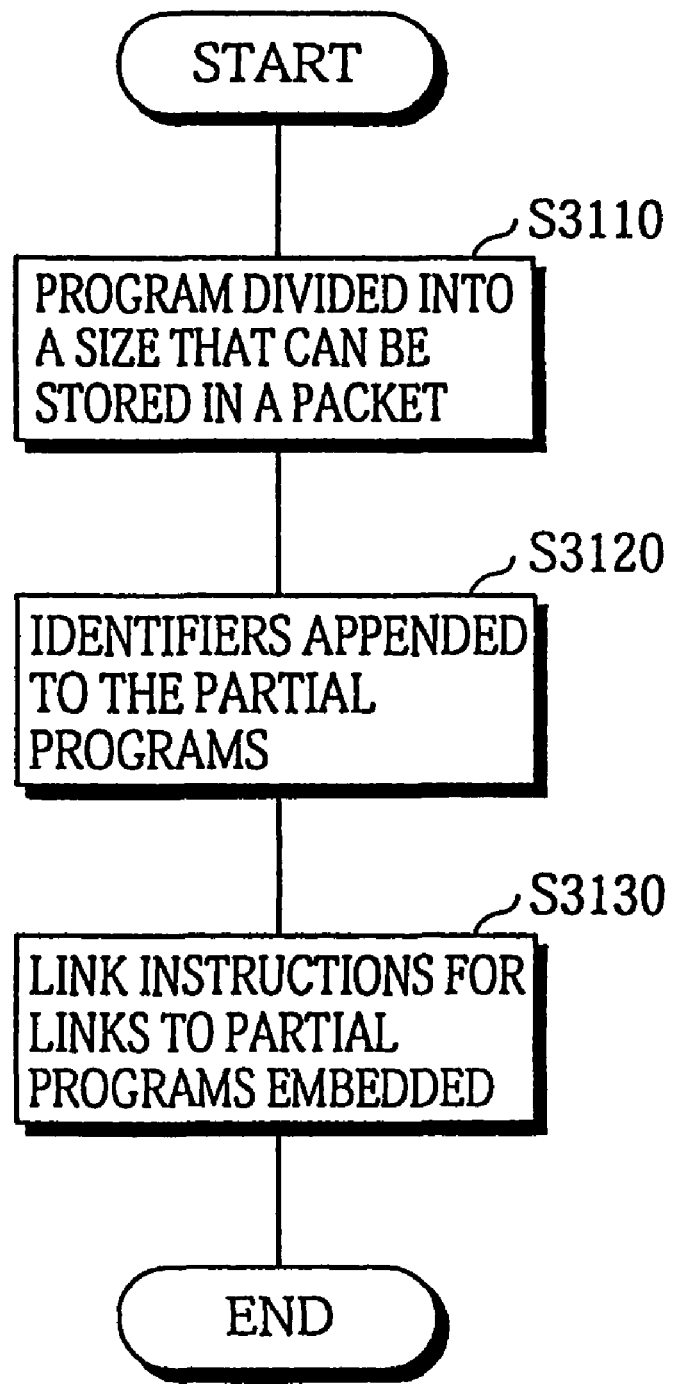
FIG. 12 is a flowchart showing the procedure for the division of the machine program 800 into the partial programs 801, 802, and 803 by the program division unit 3050.

The following is a detailed description of the operation of the program dividing unit with reference to FIG. 9, FIG. 11, and FIG. 12.

FIG. 11 shows the aspects of the division of a machine program.

The machine program 800 is a program that will be interpreted and executed by a specialized interpreter in the digital broadcast reception apparatus, and so is a bytecode program that is written in intermediate code. However, for ease of understanding, this machine program has been shown in description language format in FIG. 10.

FIG. 12 is a flowchart showing the procedure for the division of the machine program 800 into the partial programs 801, 802, 803 . . . by the program dividing unit 3050.

First, the dividing unit 3051 divides the machine program stored in the program storage unit 3010 into a size which enables the finally generated partial programs to be stored in transport packets (step S3110).

Here, the word "division" refers to the decision to store the machine program as a plurality of partial programs and the storage of a first address and a last address for the part of the machine program which corresponds to each partial program. Each partial program is identified by its first address and last address in the following processing.

The identifier appending unit 3052 then appends each partial program with a table ID which is used as an identifier (step S3120). Each table ID is an identifier for identifying a partial program. In the present example, the number "80100" is assigned as the table ID for the partial program 801, the number "80200" is assigned as the table ID for the partial program 802, and the number "80300" is assigned as the table ID for the partial program 803.

The link instruction generation unit 3053 then generates link instructions and inserts the link instructions into the partial programs so that execution control for a machine program performed over a plurality of partial programs will be possible (step S3130). Here, a link instruction is an instruction for achieving a control transformation to another partial program.

In the present example, the link instruction "GET 80200" is inserted into the partial program 801 so that continuous execution from the partial program 801 to the partial program 802 is possible. In the same way, the link instruction "GET 80300" is inserted into the partial program 802 so that continuous execution from the partial program 802 to the partial program 803 is possible.

In this example, the instruction notation "GET n" means that the execution will continue from a position in the partial program with the table ID "n".

As a result of the procedure described above, the program 800 is divided into the partial programs 801, 802, and 803. Each partial program forms a separate MPEG2 private section, with these eventually being transmitted by the transmission unit 3060.

Digital Broadcast Reception Apparatus

The following is a description of the digital broadcast reception apparatus.

Figure 13:
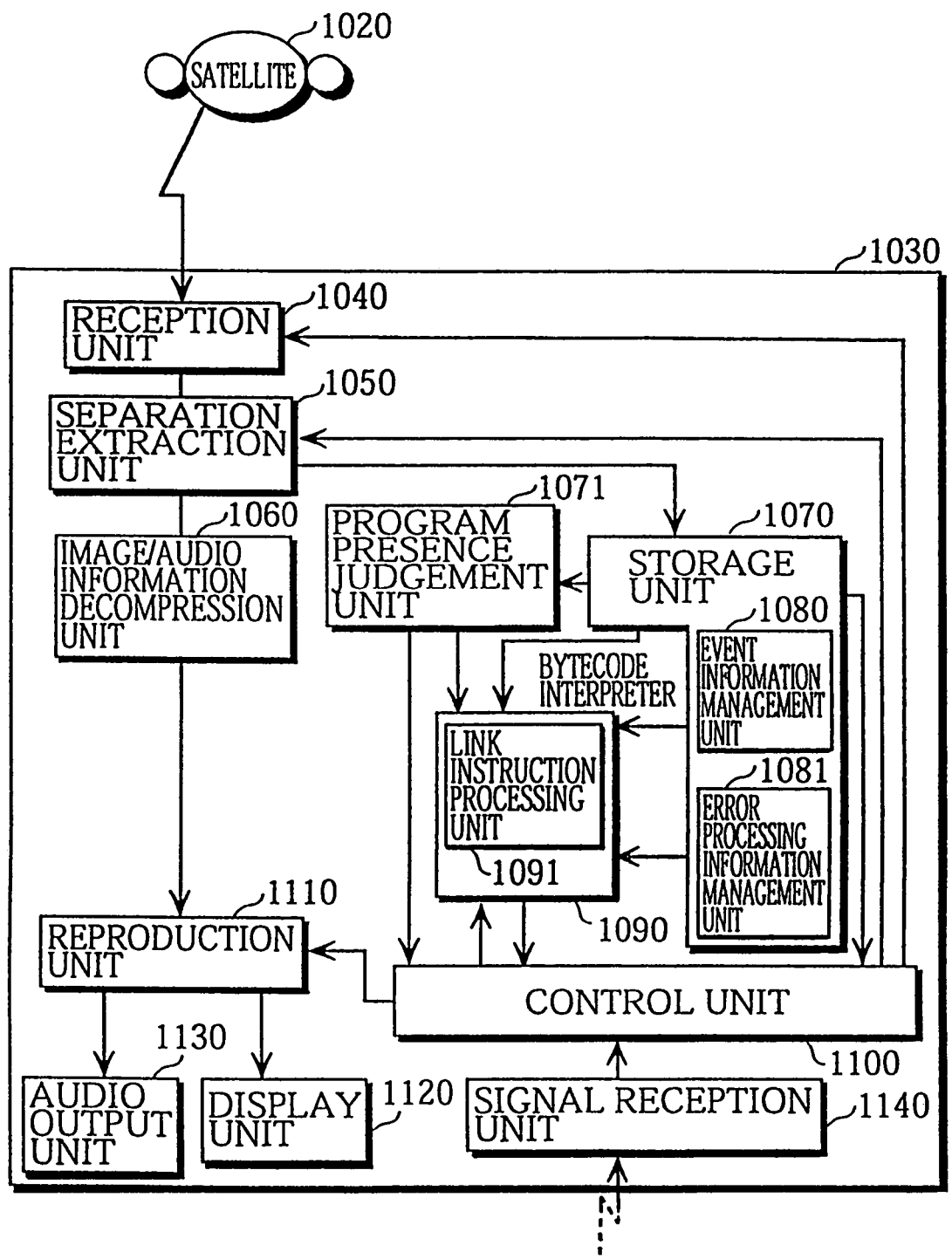
FIG. 13 is a block diagram showing the configuration of the digital broadcast reception apparatus in the first embodiment.

FIG. 13 is a block diagram showing the configuration of the digital broadcast reception apparatus of the first embodiment of the present invention.

The digital broadcast reception apparatus 1030 is an apparatus that receives a broadcast program sent via the satellite 1020 by a digital broadcast transmission apparatus that has been standardized under ISO/IEC 13818.

The digital broadcast reception apparatus 1030 is composed of a reception unit 1040, a separation extraction unit 1050, an image/audio information decompression unit 1060, a storage unit 1070, a program presence judgement unit 1071, a bytecode interpreter 1090, a control unit 1100, a reproduction unit 1110, a display unit 1120, an audio output unit 1130, and a signal reception unit 1140.

The storage unit 1070 includes an event information management unit 1080 and an error processing information management unit 1081, while the bytecode interpreter 1090 includes a link instruction processing unit 1091.

In the present example, the program presence judgement unit 1071, the bytecode interpreter 1090 and the control unit 1100 are all composed of a memory, a control program stored in the memory, and a CPU.

The signal that is sent from a digital broadcast transmission apparatus is received by the reception unit 1040 of the digital broadcast reception apparatus 1030. This reception unit 1040 has a function for switching reception between different satellites. The separation extraction unit 1050 is a TS decoder which extracts the necessary streams from the received transport streams and transfers on the extracted data. The reception unit 1040 and the separation extraction unit 1050 here are controlled by the control unit 1100 such as by giving indications for a switching of received satellite or filtering.

The separation extraction unit 1050 performs the extraction of the required streams using either a PID or a combination of a PID and a table ID, and for example will extract the transport stream 200 with the PID "10" and store it in the storage unit 1070. Here, the control unit 1100 obtains the PIDs of the images, audio and other data from the system information sent as the transport stream 200 and instructs the separation extraction unit 1050 to perform extraction.

Image and audio data is directly sent to the image/audio information decompression unit 1060 by the separation extraction unit 1050. The image/audio information decompression unit 1060 is an MPEG2 decoder which decompresses the received compressed data in real time and supplies the decompressed data to the reproduction unit 1110.

The reproduction unit 1110 follows the instructions of the control unit 1100 and outputs image data to the display unit 1120 and audio data to the audio output unit 1130.

The separation extraction unit 1050 sends data aside from image data and audio data, which is to say the program information and the machine program for the program control, to the storage unit 1070 in accordance with instructions given by the control unit 1100. As a result, data for program control, such as data for the Electric Program Guide (EPG) standardized for Digital Video Broadcasting (DVB) in Europe and the bytecode program that will be interpreted and executed by the bytecode interpreter 1090 are stored in the storage unit 1070.

It should be noted here that the bytecode program is divided into partial programs.

The data for the program control described above includes a table ID for a first partial program in each bytecode program that should be activated in response to one of a variety of events that can occur due to a user operation or due to the operation of the device. This data is stored in the event information management unit 1080 according to control by the control unit 1100.

Data which is error processing information is stored in the error processing information management unit 1081. Error processing information is composed of an error processing table and an error process in error processing table. The error processing information management unit 1081 also stores a default error processing table and a default error process in error processing table in advance.

A description of how this error processing information is handled is given later in this specification.

The information stored in the event information management unit 1080 is referred to by the control unit 1100 in order to be able to indicate the partial program that is to be executed when the control unit 1100 activates the bytecode interpreter 1090 in response to the occurrence of an event.

The error processing information stored by the error processing information management unit 1081 is referred to by the bytecode interpreter 1090 when error processing is required.

The signal reception unit 1140 receives an input signal from the user which may be made using a remote controller or the like. The signal received by the signal reception unit 1140 is sent to the control unit 1100 as data, and the control unit 1100 performs a judgement on this data, before instructing the bytecode interpreter 1090 to execute a bytecode program or performing other service processing such as EPG.

It should be noted here that a memory management unit (not illustrated) is provided as a device that performs region management for the storage unit 1070. This memory management unit performs memory management for a data write operations such as when a partial program is separated and extracted and needs to be written into the storage unit 1070. When there is insufficient free space in the storage unit 1070 for writing in a partial program, the memory management unit uses a Least Recently Used (LRU) algorithm to delete one or more of the partial programs stored in the memory and, having cleared sufficient space, writes the new partial program into the memory.

The bytecode interpreter 1090 is an interpreter that can successively interpret and execute bytecode programs. When executing a bytecode program, the bytecode interpreter 1090 translates the bytecodes into native code for the processors in the various components in the digital broadcast reception apparatus and has the processors of these components activated.

Bytecode programs are transmitted having been divided into a plurality of partial programs at the digital broadcast transmission apparatus side, and so are each composed of a collection of partial programs.

The following is a description of the operation of the bytecode interpreter 1090 with reference to FIGS. 11, 13, 14, and 15.

Figure 14:
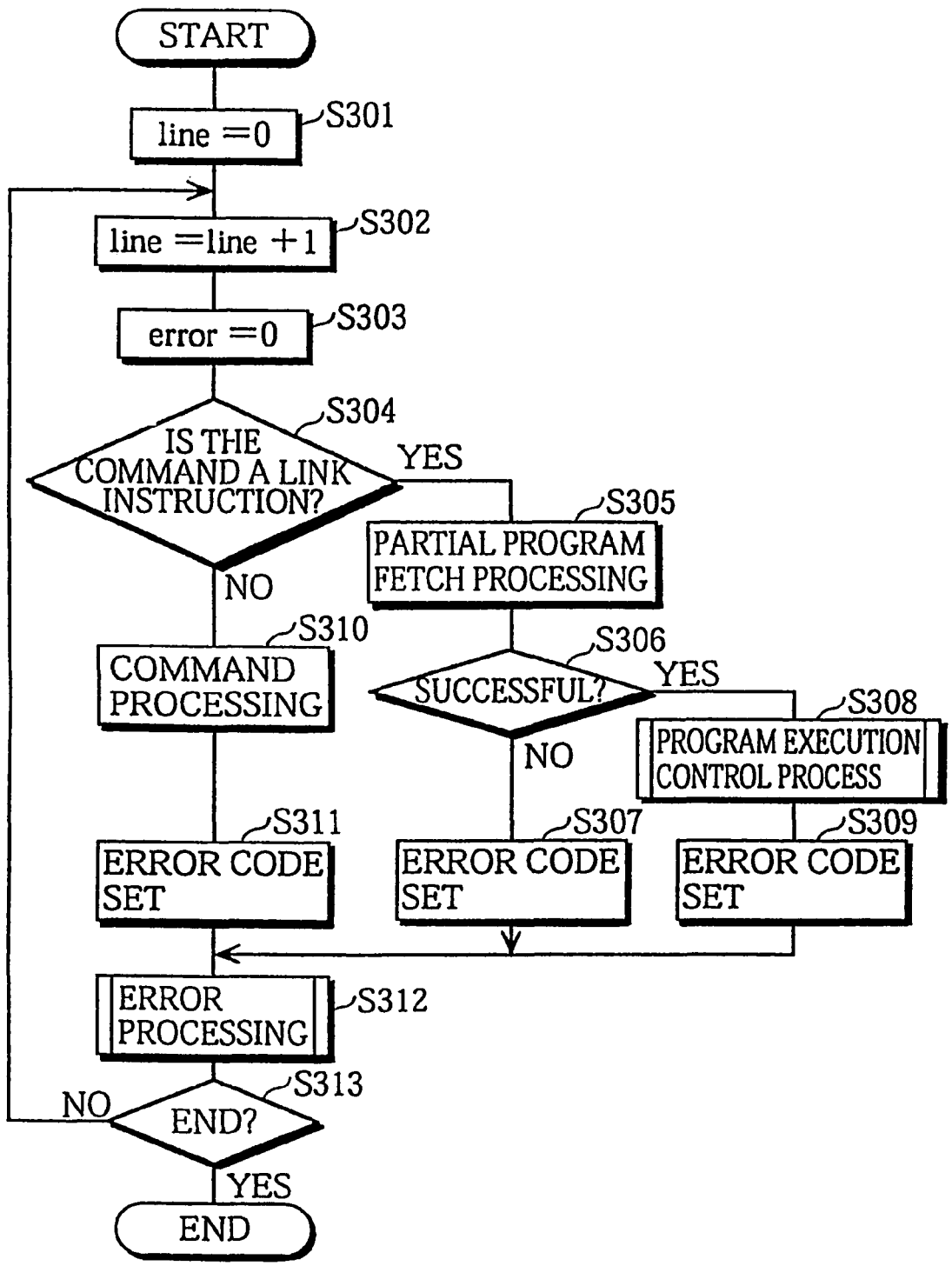
FIG. 14 is a flowchart showing the bytecode program execution control processing performed by the bytecode interpreter 1090.

FIG. 14 is a flowchart showing the bytecode program execution control processing performed by the bytecode interpreter 1090. The processing flow in FIG. 14 is a procedure that executes a bytecode program corresponding to an event that has occurred during the operation of each component or an event that has occurred as a result of a user operation.

In the present example, the bytecode program is composed of the partial programs 801, 802, and 803 that are shown in FIG. 11, with the partial program 801 being presently stored in the storage unit 1070 and its execution being about to be commenced.

First, the variable "line" which expresses a program line for reading, interpreting and executing is reset to "0" (step S301). Following this, "1" is added to the variable "line" (step S302), and the variable "error" which shows an error code is reset to "0" (step S303).

Next, the bytecode interpreter 1090 judges whether the command on the program line indicated by the variable "line" is a link instruction that is a command for fetching another partial program (step S304). If so, the fetch process (step S305) for a partial program is performed, or otherwise the command processing (step S310) is performed.

As a result of the above operation, the command "PUSH A" in the partial program 801 is executed by the command processing in step S310. This command processing (step S310) is processing that executes the processing corresponding to the various kinds of commands by performing a variable operation inside the bytecode interpreter 1090 and/or by having the control unit 1100 control the various components of the digital broadcast reception apparatus and the apparatuses that are externally connected.

After the command processing has been executed, the error code which shows the execution result is set (step S311). Error processing is then performed (step S312) and if the program is not completed by the execution of this command, the processing returns to step S302 where "1" is added to the variable "line" and the next line is processed.

As a result of the above processing, the command "PUSH B" is next executed for the partial program 801. After the processing in steps S302, S303, S304, S310, S311, S312, and S313 has been repeated, the command "GET 80200" is executed for the partial program 801.

Since the command "GET 80200" is a link instruction, the "Yes" branch of step S304 is taken and the program fetch processing is executed (step S305).

Figure 15:
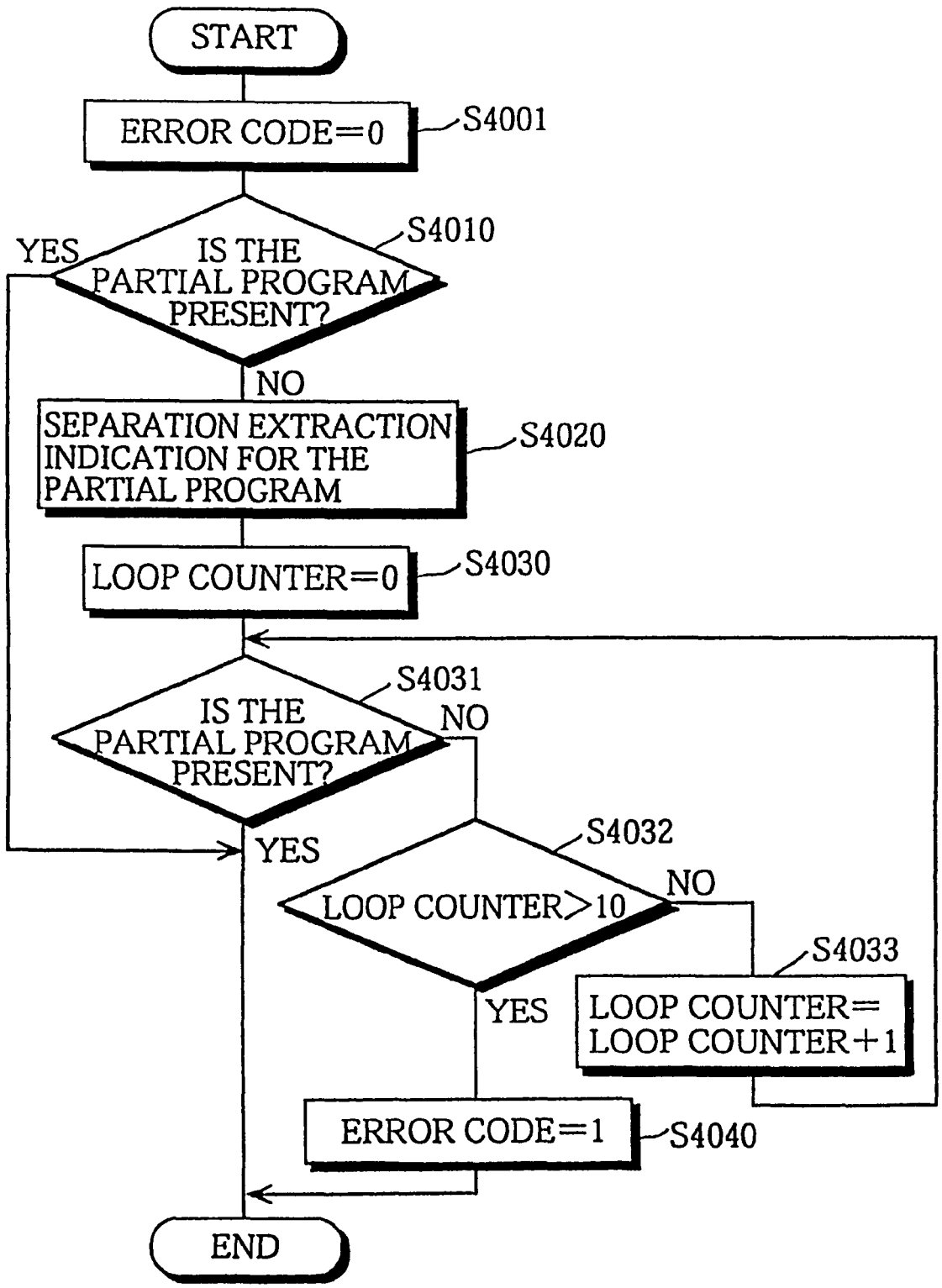
FIG. 15 is a flowchart showing the partial program fetch processing.

FIG. 15 is a flowchart showing the partial program fetch processing.

First, the link instruction processing unit 1091 sets the error code at "0" (step S4001).

An inquiry is then made to the program presence judgement unit 1071 to check whether the partial program with the table ID "80200" is present (step S4010). When this is the case, the "Yes" branch is taken and the partial program fetch processing is completed.

When the partial program is not present, an indication is given to the separation extraction unit 1050 via the control unit 1100 for the extraction of a partial program whose table ID=80200 (step S4020).

Next, to prevent the processing forming an endless loop, the loop counter is set at "0" (step S4030).

An inquiry is again made to the program presence judgement unit 1071 to check whether the partial program with the table ID "80200" is present (step S4031). When this is the case, the "Yes" branch is taken and the partial program fetch processing is completed.

If the desired partial program is not present, the "No" branch is taken and if the loop counter is 10 or less (step S4032), "1" is added to the loop counter and the processing returns to the check to see whether the desired partial program is present (step S4031).

When the value of the loop counter is greater than "10" in step S4032, the error code is set at "1" (step S4040).

This completes the partial program fetch processing.

The following description will once again focus on the flowchart in FIG. 14.

The bytecode interpreter 1090 judges whether the partial program fetch processing has been successful from the error code (step S306). When this is the case, the "Yes" branch is taken and the program execution control processing is performed (step S308). This is to say, the program execution control processing shown by the entire flowchart in FIG. 14 is newly executed for the fetched partial program.

At this point, information that relates to processing that has hitherto been performed and that will be needed when the new program execution control processing has been completed is stored within the bytecode interpreter.

As a result of the processing described above, the partial program 802 is executed (steps S301-s313).

After this, the error code is set in accordance with any errors in the program execution control processing (step S309).

When the partial program fetch processing has failed (step S305), the processing advances from S306 to S307 and the error code is set.

Error processing is then performed based on the error code (step S312). In this error processing, no processing is performed when the error code is "0".

If the program has been completed, the processing will be completed at step S313, otherwise the processing will return once again to step S302 where "1" is added to the variable "line" so that the next line is processed thereafter.

When the command "GET 80300" has been executed for the partial program 802, the partial program 803 is then executed and since the indication "END" is given at the end of partial program 803, the bytecode program is judged in step S313 as having ended, so that the flow in FIG. 14 is completed.

The bytecode interpreter 1090 successively executes the partial programs 801, 802, and 803 by performing the procedure described above.

The following is a detailed description of the error processing in step S312 of FIG. 14. This error processing is performed by referring to the error processing information stored in the error processing information management unit 1081, which is to say the error processing table and the error process in error processing table.

Figure 16:
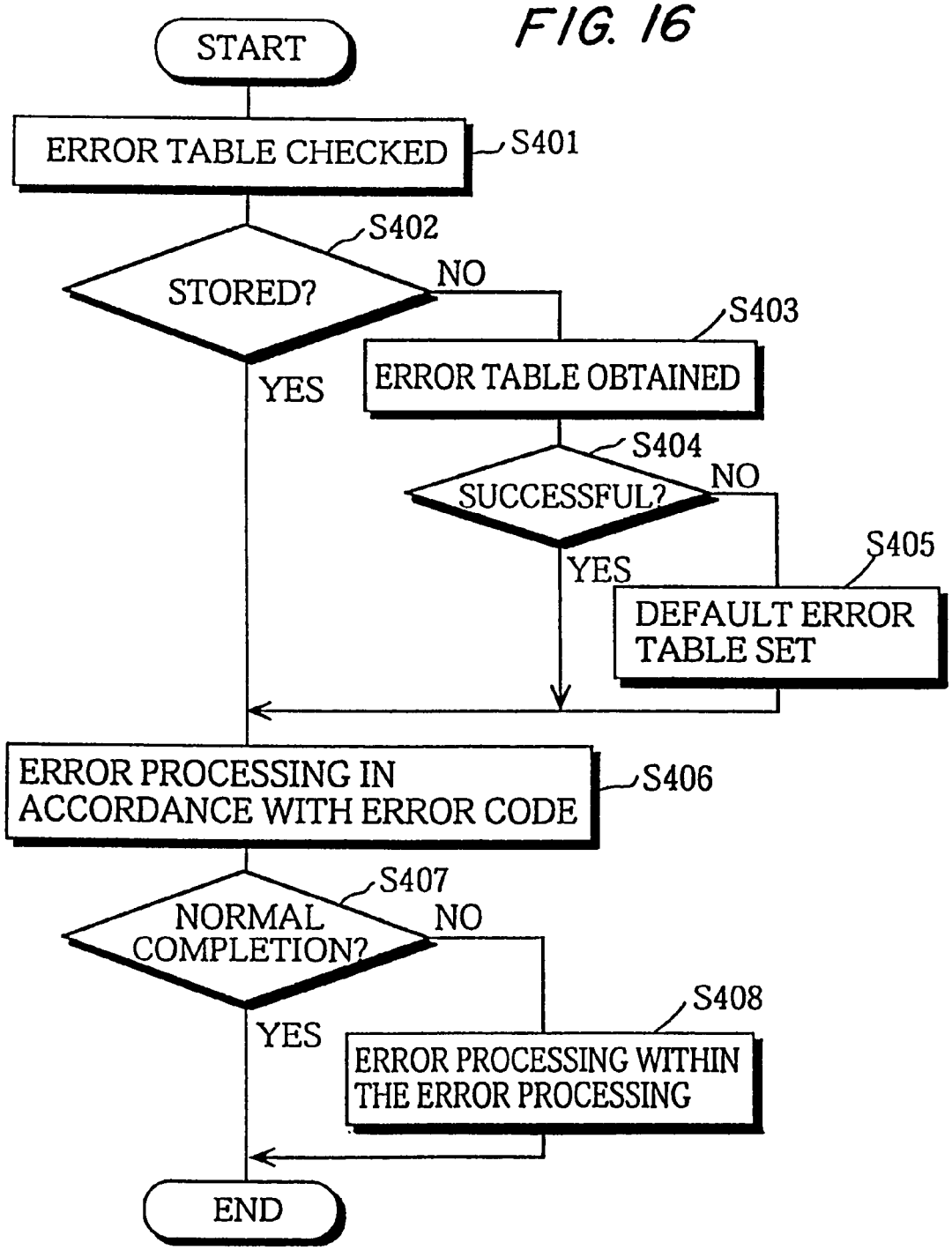
FIG. 16 is a flowchart showing the error processing.

FIG. 16 is a flowchart showing the error processing. In the following explanation, the error processing table and the error process in error processing table will be collectively referred to as the "error tables" while the default error processing table and the default error process in error processing table will be collectively referred to as the "default error tables".

First, a check is performed to see whether the error tables are stored by the error processing information management unit 1081 (step S401). If the tables are already stored (step S402), error processing is performed in accordance with the stored tables (step S406). If it is judged in step S402 that the error tables have not been stored, the error table fetch processing (step S403) is performed. The table ID of error tables is predetermined, so that the fetching of the error tables is performed by indicating this table ID and controlling the separation extraction unit 1050 via the control unit 1100.

If the error tables can be obtained, the error processing information management unit 1081 stores the obtained error tables. When the error tables cannot be obtained for whatever reason, such as that the error tables cannot be received (step S404), the error processing information management unit 1081 makes a setting so that the default error tables which are stored beforehand are treated as the error tables (step S405). By doing so, the error tables are set so that the error processing can be performed (step S406). Here, an error code that is not registered in the error tables (such as "0") is interpreted as showing that there is no error, so that no processing is performed.

When an error occurs during the error processing in accordance with the error tables in step S406 (step S407), the error process in error processing table is referred to and the error process in error processing is performed (step S408).

This completes the description of the error processing which is represented by step S312 in FIG. 14.

The following is a description of the error processing table, the error process in error processing table, the default error processing table, and the default error process in error processing table which are referred to in the error processing in step S406, with reference to FIGS. 17 and 18.

FIG. 17 shows the composition of the error processing table and the error process in error processing table, in addition to the error processing codes.

The error processing table 501 and the error process in error processing table 502 are tables that associate error codes with error processing codes. The error processing legends 503 show examples of the settings for the error processing codes stored in the error processing table 501 and the error process in error processing table 502. As shown by the error processing legends 503, the error processing codes are combinations of a "CODE" which shows the error processing itself and an "OP" code which shows the state after the error processing.

As one example, in the error processing table 501, the error processing code 0102 is assigned to the error code 001 which results from a division by zero. As shown by the error processing legends 503, this error processing code 0102 refers to the cancellation of the present content (this being the processing unit for which the program is presently being processed) and default processing for a service. The default processing for a service can, for example, be the display of a screen for a menu selection.

In the same way, the error processing code 0399 is assigned to the error code 002 which is set when a stack overflow has occurred. This error processing code 0399 refers to the execution of a partial program with the table ID "99".

The error process in error processing table 502 has the same composition as the error processing table. This error process in error processing table 502 shows the processing that is performed when an error has already occurred, so that more stable processing can be performed.

FIG. 18 shows the composition of the default error processing table and the default error process in error processing table.

The default error processing table 601 and the default error process in error processing table 602 have the same composition as the error processing table 501 and the error process in error processing table 502, respectively.

By doing so, the present digital broadcast reception apparatus can fetch bytecode programs, which have been divided and transmitted, as necessary and execute the bytecode programs, so that the apparatus will be able to respond quickly to a variety of events that may occur due to a user operation or during the operation of the various components.

Second Embodiment

The program transmission apparatus and program reception/execution apparatus of the second embodiment of the present invention are described below.
Digital Broadcast Transmission Apparatus The present digital broadcast transmission apparatus is an apparatus which compresses digital image data and digital audio data that compose a broadcast program, program information, and machine programs such as for program control, and then multiplexes and transmits the compressed data. This digital broadcast transmission apparatus conforms to ISO/IEC 13818 standard.

Figure 19:
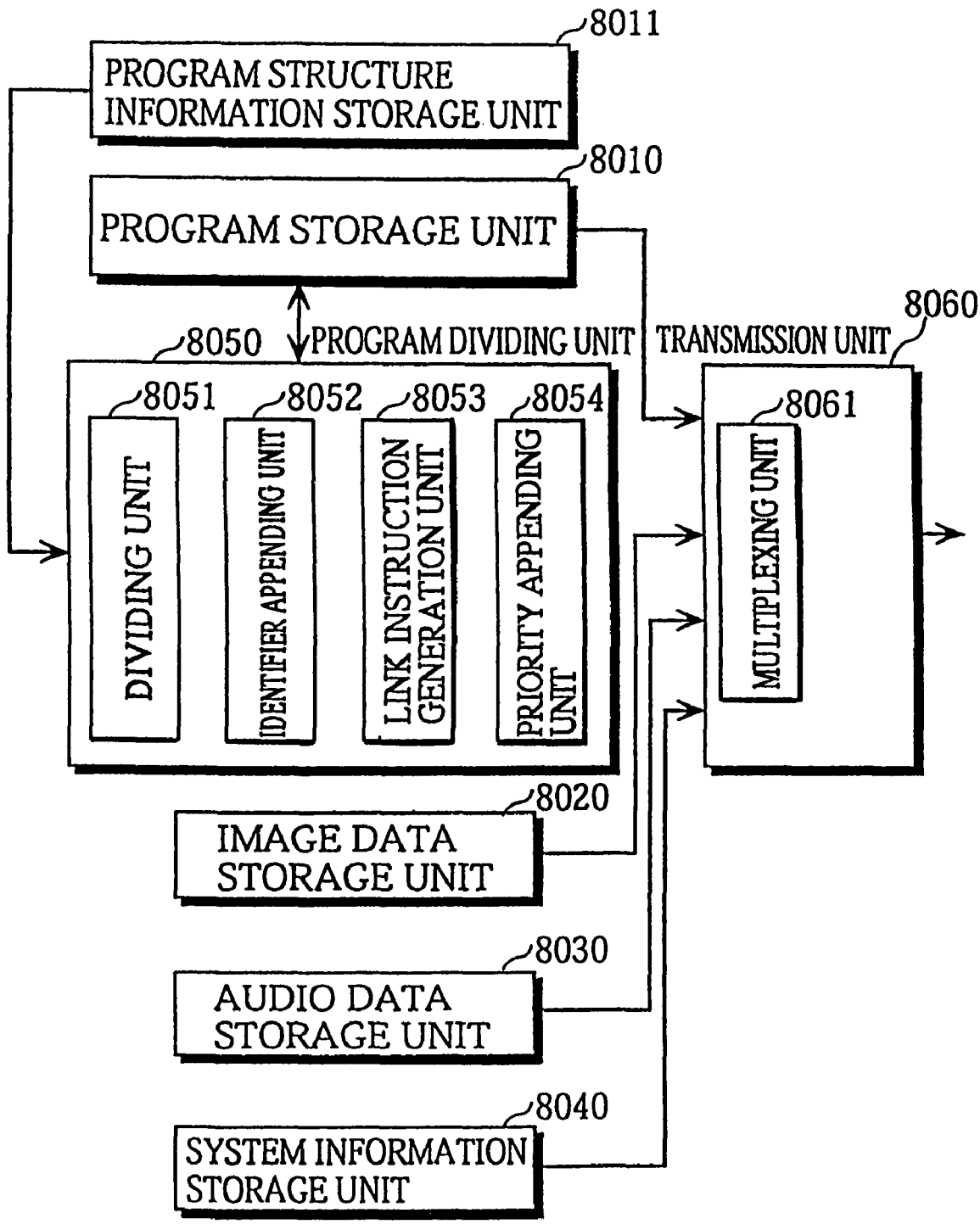
FIG. 19 is a block diagram showing the configuration of the digital broadcast reception apparatus in the second embodiment.

FIG. 19 is a block diagram showing the configuration of the digital broadcast transmission apparatus in the second embodiment of the present invention.

The program storage unit 8010 stores information for broadcast programs and a machine program which is used for broadcast program control. The image data storage unit 8020 stores image data that composes the broadcast programs. The audio data storage unit 8030, meanwhile stores audio data that composes the broadcast programs. The system information storage unit 8040 stores system information that is information for extracting image data, audio data, information for broadcast programs, and the machine program.

The program structure information storage unit 8011 stores information relating to the structure of the machine program stored in the program storage unit 8010. Hereafter, the information that relates to the structure of the machine program will be referred to as program structure information.

The program dividing unit 8050 refers to the program structure information storage unit 8011 and divides the machine program stored in the program storage unit 8010. Here, the parts of the machine program that result from this division are called "partial programs".

The program dividing unit 8050 includes a dividing unit 8051 which divides the machine program stored in the program storage unit 8010, an identifier appending unit 8052 for appending each of the divided parts of the program with information for identifying each partial program, a link instruction generation unit 8053 for writing link instructions, which are control transfers to another partial program, into the partial programs, and a priority appending unit 8054 for setting a priority value for each partial program which shows the frequency with which each partial program is repeatedly transmitted.

The transmission unit 8060 has the multiplexing unit 8061 convert the information for the broadcast programs and the plurality of partial programs in the program storage unit 8010, the image data in the image data storage unit 8020, the audio data in the audio data storage unit 8030, and the system information in the system information storage unit 8040 into transport streams under MPEG2, multiplexes the transport streams, and transmits the result. In performing the multiplexing, the multiplexing unit 8061 refers to the priority values that are set for each partial program. It should be noted here that these priority values are stored in a predetermined area in the program storage unit 8010 by the priority appending unit 8054.

The differences between the digital broadcast transmission apparatus of the second embodiment and that of the first embodiment are that the former further includes a program structure information storage unit 8011, the program dividing unit 8050 of the former refers to the program structure information storage unit 8011, and that the multiplexing unit 8061 of the former performs multiplexing having referred to the priorities assigned to each of the partial programs.

Figure 20:
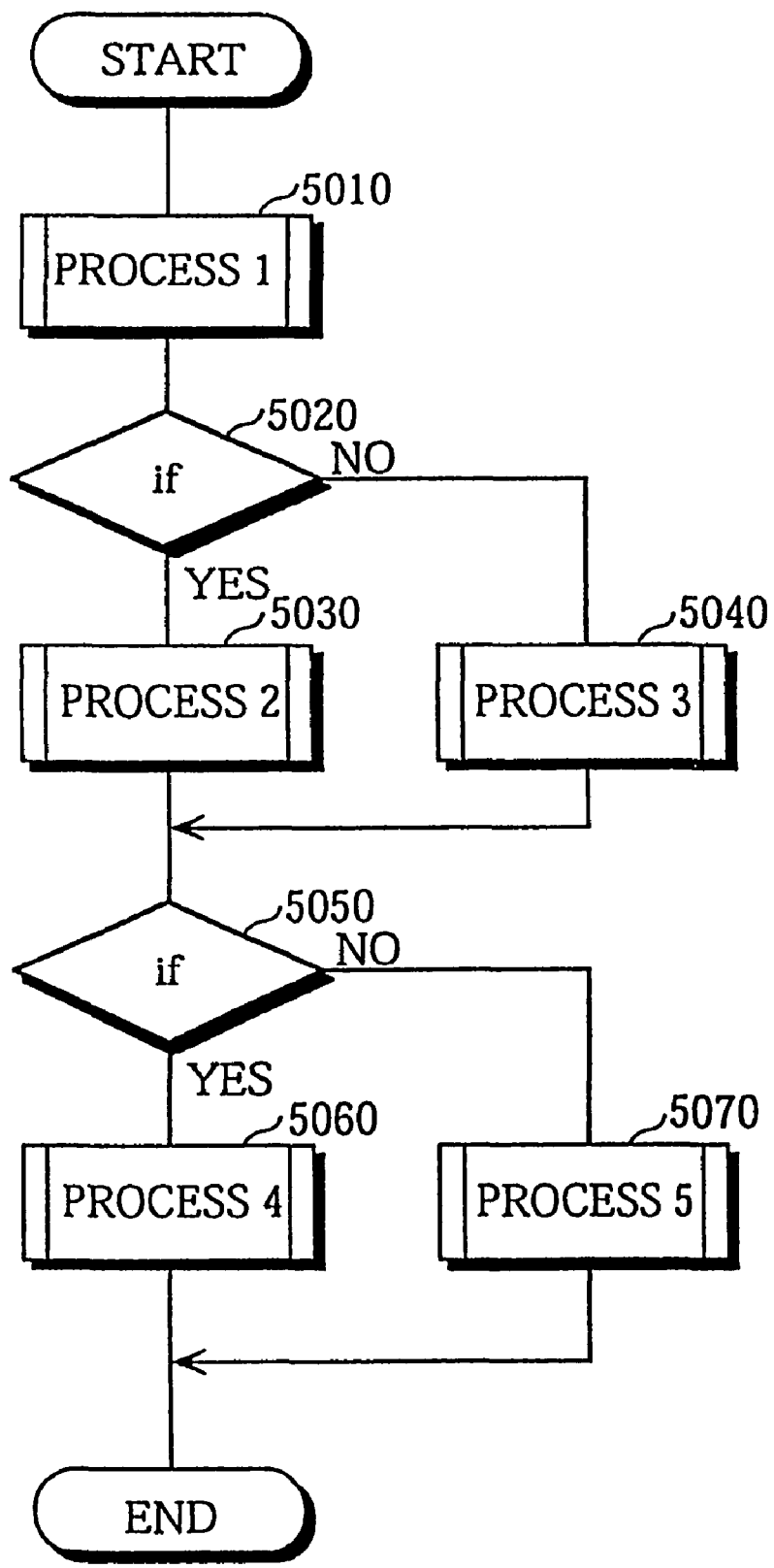
FIG. 20 is a representation of the program structure of the machine program.
Figure 21:
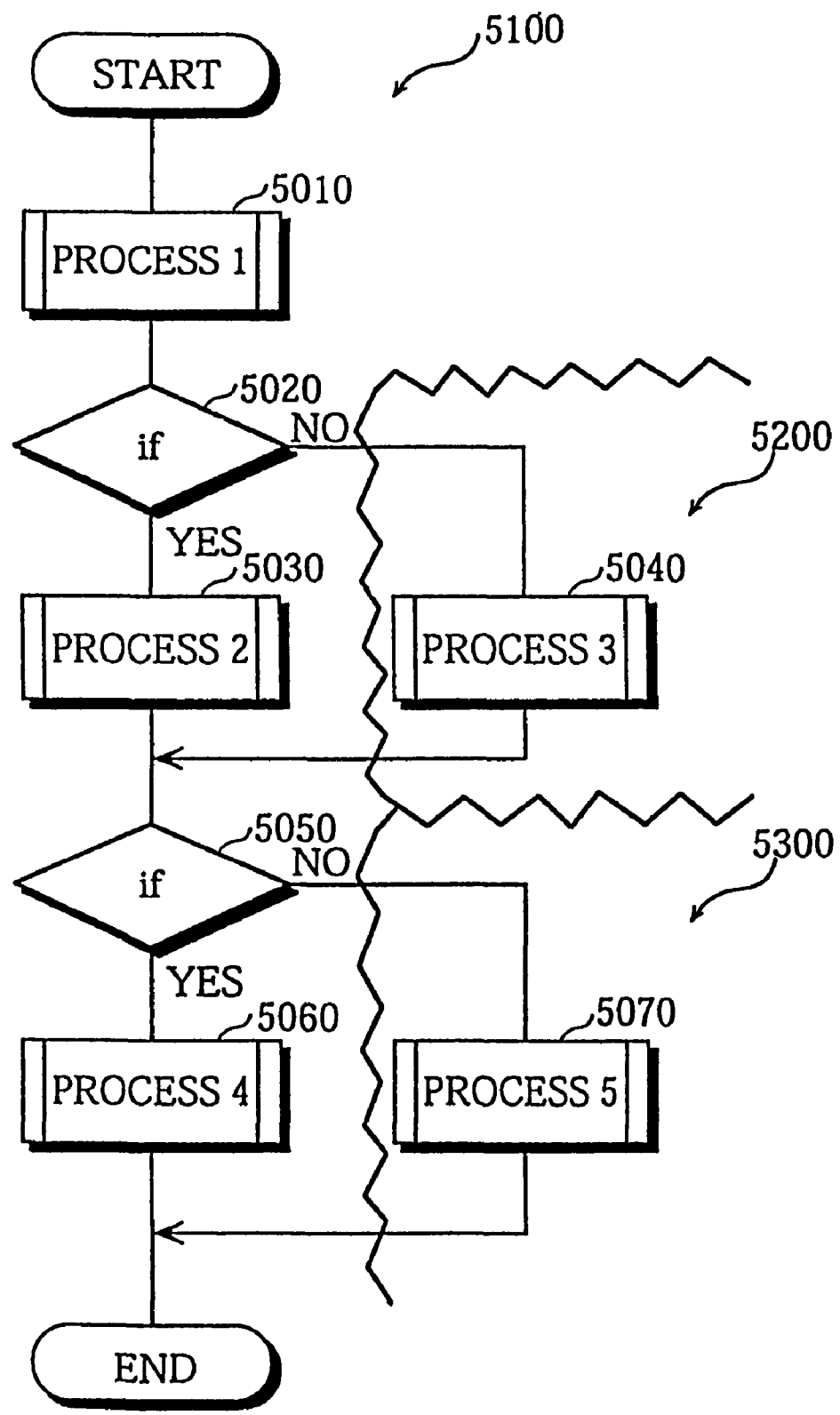
FIG. 21 is a representation of the machine program after division.

The following is a detailed description of the operation of the program dividing unit 8050 with reference to FIG. 12, FIG. 20, and FIG. 21.

FIG. 20 is a representation of the program structure.

In general, machine programs include a number of branches. Information which relates to the structure of a program, such as information about branches and subprogram call operations is called program structure information. As one example, source programs that are written in a high-level language contain program structure information for the program itself. When a source program that is written in a high-level language is compiled, the resulting intermediate code will also include program structure information.

In this second embodiment, the program structure information storage unit 8011 stores program structure information at the source program level. This is to say, the program storage unit 8010 stores information relating to "if" statements and "switch-case" statements in C language for the program stored in the program storage unit 8010 that is going to be divided.

The program structure information storage unit 8011 also stores information relating to level-demarcated processing. The level-demarcated processing is processing whose content corresponds to the processing ability of the digital broadcast reception apparatus, and as one example, can be selectively executed processing where a digital broadcast reception apparatus with a high processing ability performs the processing for level 1, a digital broadcast reception apparatus with a medium processing ability performs the processing for level 2, and a digital broadcast reception apparatus with a low processing ability performs the processing for level 3. As examples of levels that are based on display processing ability, level 1 can be the ability to have a whole screen blink at intervals of 10 milliseconds, while level 2 can be the ability to have an area within a frame drawn on the screen blink at intervals of 10 milliseconds, and level 3 can be the ability to have an area within a frame drawn on the screen blink at intervals of 100 milliseconds.

It should be noted here that the program structure information for a machine program can be generated by analyzing the source program when the level-demarcated processing is set as being expressed in a predetermined format, such as "switch levels".

As in the first embodiment, the program division unit 8050 operates in accordance with the flowchart shown in FIG. 12.

In step S3110, the dividing unit 8051 refers to the program structure information stored in the program structure information storage unit 8011 and divides the machine program stored in the program storage unit 8010.

The first rule for the execution of this division is that the machine program is divided into partial programs of a size which enables the finally generated partial programs to be stored in transport packets (S3110). Note that this first rule is applied after the other rules for the division have been applied.

The second rule for the execution of the division is that when branches are caused in the machine program due to the presence of "if" statements, these branch destinations will be divided into separate partial programs.

The third rule for the execution of the division is that when branches are caused in the machine program due to the presence of "switch-case" statements, the different branches for each "case" will be divided into separate partial programs.

FIG. 21 shows a representation of a machine program after division.

The dividing unit 8051 divides the machine program into a "process 2" shown as block 5030 and a "process 3" shown as block 5040 using the "if" statement shown as the judgement block 5020, and into a "process 4" shown as block 5060 and a "process 5" shown as block 5070 using the "if" statement shown as the judgement block 5050. As a result, the present machine program is divided into three partial programs 5100, 5200, and 5300. It should be noted here that each of these partial programs 5100, 5200, and 5300 are smaller than a transport packet.

Figure 22:
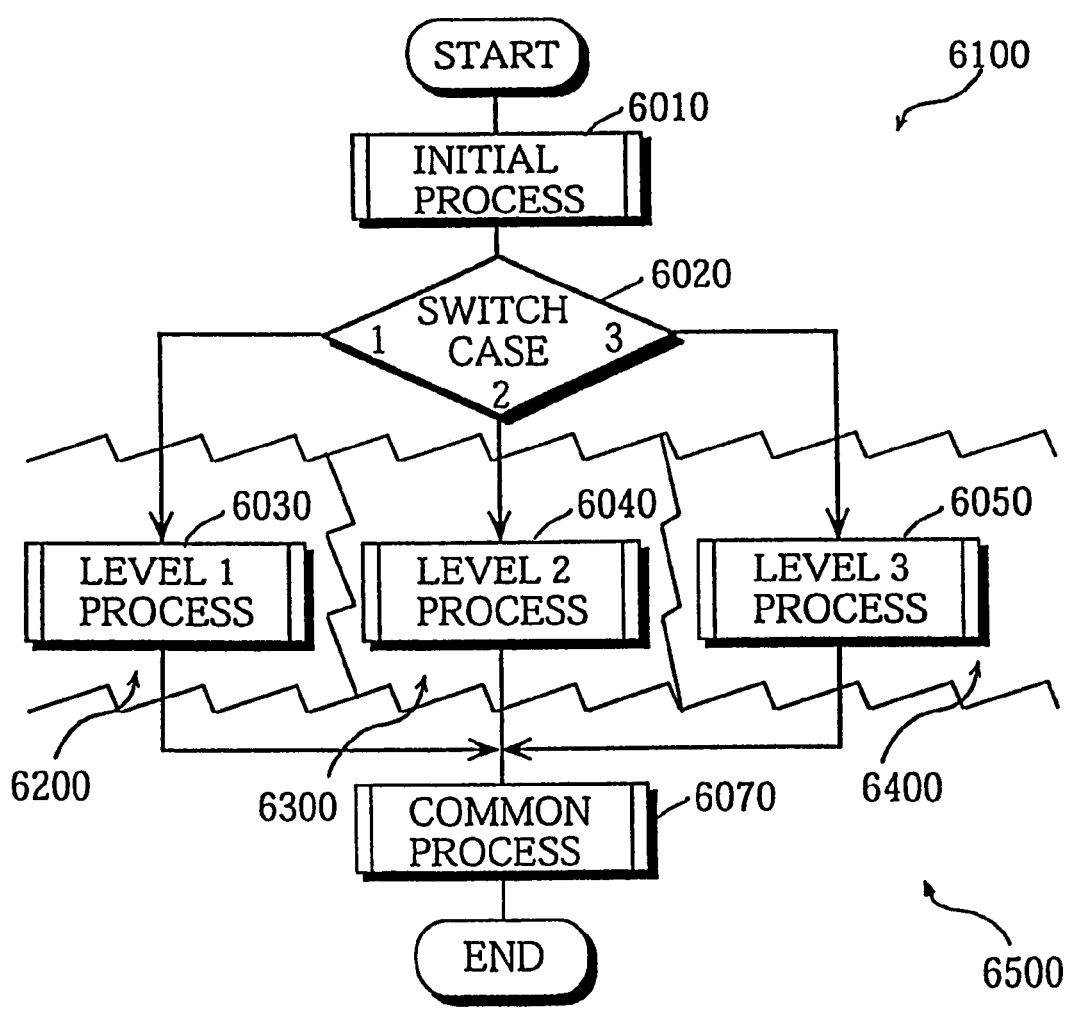
FIG. 22 is a representation of a machine program with a construction including a "switch-case" statement after division.

FIG. 22 shows a representation of a machine program whose structure includes a "switch-case" statement after the machine program has been divided. Here, FIG. 22 shows a representation of the level-demarcated processing.

The dividing unit 8051 divides the machine program into a level 1 process that is shown by block 6030, a level 2 process that is shown by block 6040, and a level 3 process that is shown by block 6050 according to the "switch-case" statement shown as judgement block 6020.

As a result, the present machine program is divided into the five partial programs 6100, 6200, 6300, 6400, and 6500. Once again, each of these partial programs is smaller than a transport stream.

In this way, the dividing unit 8051 divides a machine program into a plurality of partial programs (step S3110).

Next, the identifier appending unit 8052 refers to the program structure information and appends each partial program with a table ID (Step S3120). Here, the partial programs 6200, 6300, and 6400 that compose the level-demarcated processing described above are assigned table IDs that show their interrelationship. As a result, the partial program 6200 is assigned the table ID "60101", the partial program 6300 is assigned the table ID "60102", and the partial program 6300 is assigned the table ID "60103".

The link instruction generation unit 8053 then inserts link instructions into the partial programs (step S3130). Here also, the link instruction generation unit 8053 refers to the program structure information and generates the link instruction "GET 6010X" and inserts it at the end of the partial program 6100 which is the branch source of the level-demarcated processing.

Here, the link instruction is an instruction which gives an indication for the fetching and execution of a partial program with the table ID 6010n (where n is the level number). This means that a link instruction with the format "GET mX" has a base identifier m, so that the identifier of the partial program that is to be fetched is indicated by a combination of the base identifier m and a level number. The base identifier referred to here is an identifier which, when combined with a level number, enables an identifier to be generated. Accordingly, when the structure that controls the execution of machine programs in the digital broadcast reception apparatus interprets and executes a "GET 6010X" instruction, the level number of the digital broadcast reception apparatus is combined with the base identifier "6010" to produce the table ID which is the identifier of the partial program to be obtained.

Accordingly, after these partial programs have eventually been transmitted, the partial program 6100 will be interpreted by the bytecode interpreter of a digital broadcast reception apparatus so that one of the partial programs 6200, 6300, and 6400 will be fetched and executed.

In this way, the program dividing unit 8050 refers to the program structure information and divides the machine program into a plurality of partial programs.

Figure 23:
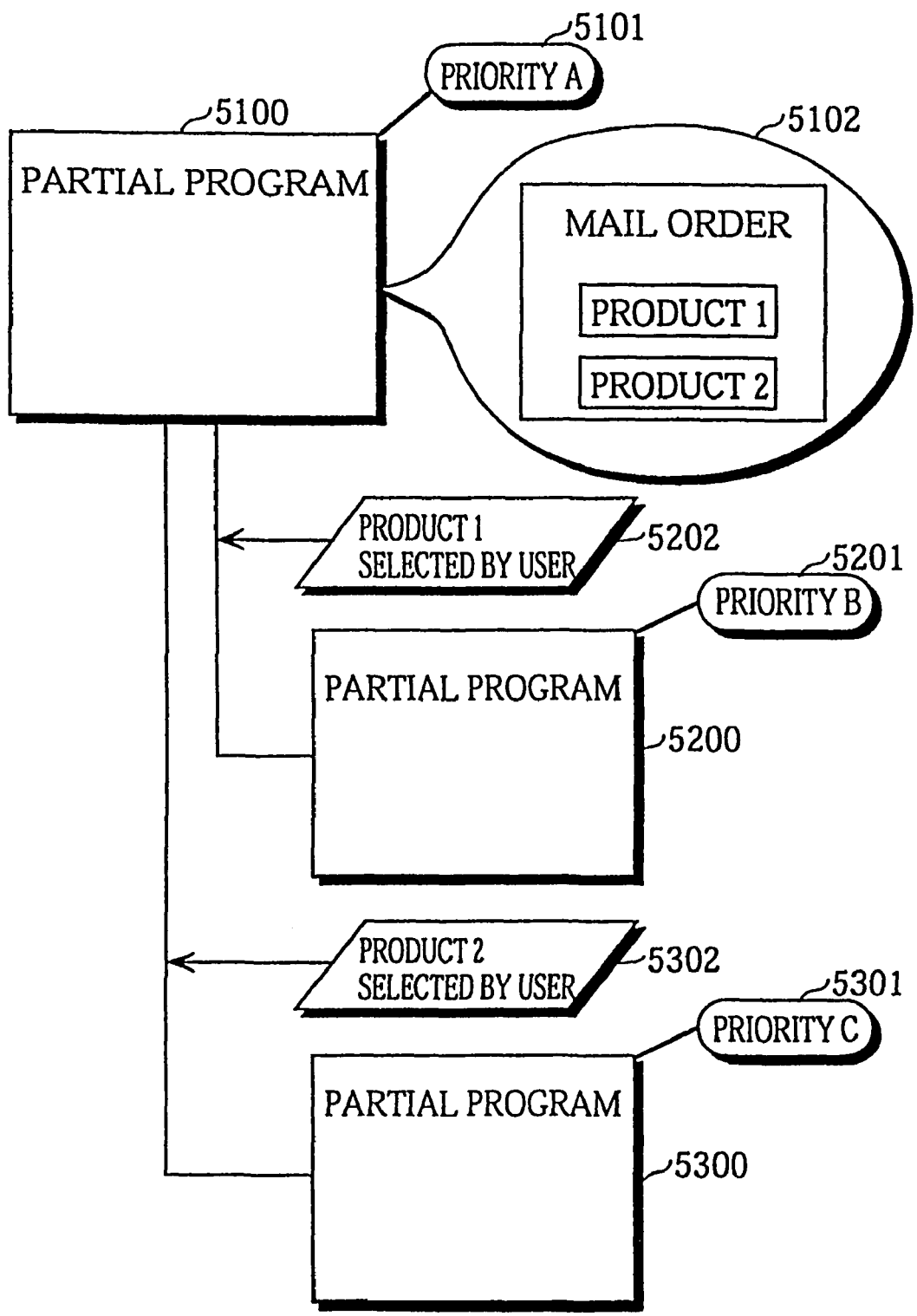
FIG. 23 shows the priorities of partial programs.

The following is a description of the assigning of priority values to the partial programs by the priority appending unit 8054 of the program dividing unit 8050, with reference to FIG. 23.

FIG. 23 is a representation of the priority values of the partial programs.

In FIG. 23, the relationship between the partial program 5100, the partial program 5200, and the partial program 5300 is shown by the priority values 5101, 5201 and 5301 that are respectively set for these partial programs.

The screen image 5102 is an example image for a screen that is displayed by the operation given in the partial program 5100, and is a representation of the screen during a mail-order program that displays buttons which have the legends "Product 1" and "Product 2". In this example, the processing corresponding to the case where the user selects the button with the legend "Product 1" is the partial program 5200, while the processing corresponding to the case where the user selects the button with the legend "Product 2" is the partial program 5300.

The priority appending unit 8054 refers to the program structure information stored in the program structure information storage unit 8011 and determines the main partial programs out of the plurality of partial programs before assigning the highest priority value A to these determined partial programs. In the present example, the partial program 5100 which is the entrance part of the main program is assigned this highest priority value A (see FIG. 21).

The priority appending unit 8054 next investigates the partial programs that are branch destinations of the partial program with the priority value A, such as partial programs branched to by an "if" statement, and assigns any partial programs it finds a priority value B which is not as high as priority value A. In the present example, the partial program 5200 and the partial program 5300 are assigned the priority level B (see FIG. 21).

The priority appending unit 8054 investigates the partial programs that are the branch destinations of the partial programs with the priority value B, and assigns any partial programs it finds a priority value C which is not as high as priority value B. Note that in the present example, no partial programs are assigned this priority value C.

As a result of the operation described above, the priority appending unit 8054 assigns priority values to each of the partial programs and stores the assigned priority values in a predetermined area in the program storage unit 8010.

It should be noted here that for a program which operates in accordance with user operations, it is normal for branch structures to be used to realize the processing corresponding to the user operations (see FIGS. 21 and 23). Because of this, the digital broadcast transmission apparatus of the present embodiment is designed so that the priority appending unit 8054 assigns priority values based on these branch structures, which is to say that priority values are assigned based on the depth of the branches in the program. However, the priority assigning is not restricted to this method, so that the program structure information storage unit 8011 may store information relating to priority values beforehand, so that the priority values can be assigned in accordance with such information.

The following is a description of the multiplexing of the partial programs by the multiplexing unit 8061 in accordance with the set priority values. This description will refer to FIG. 24.

Figure 24:
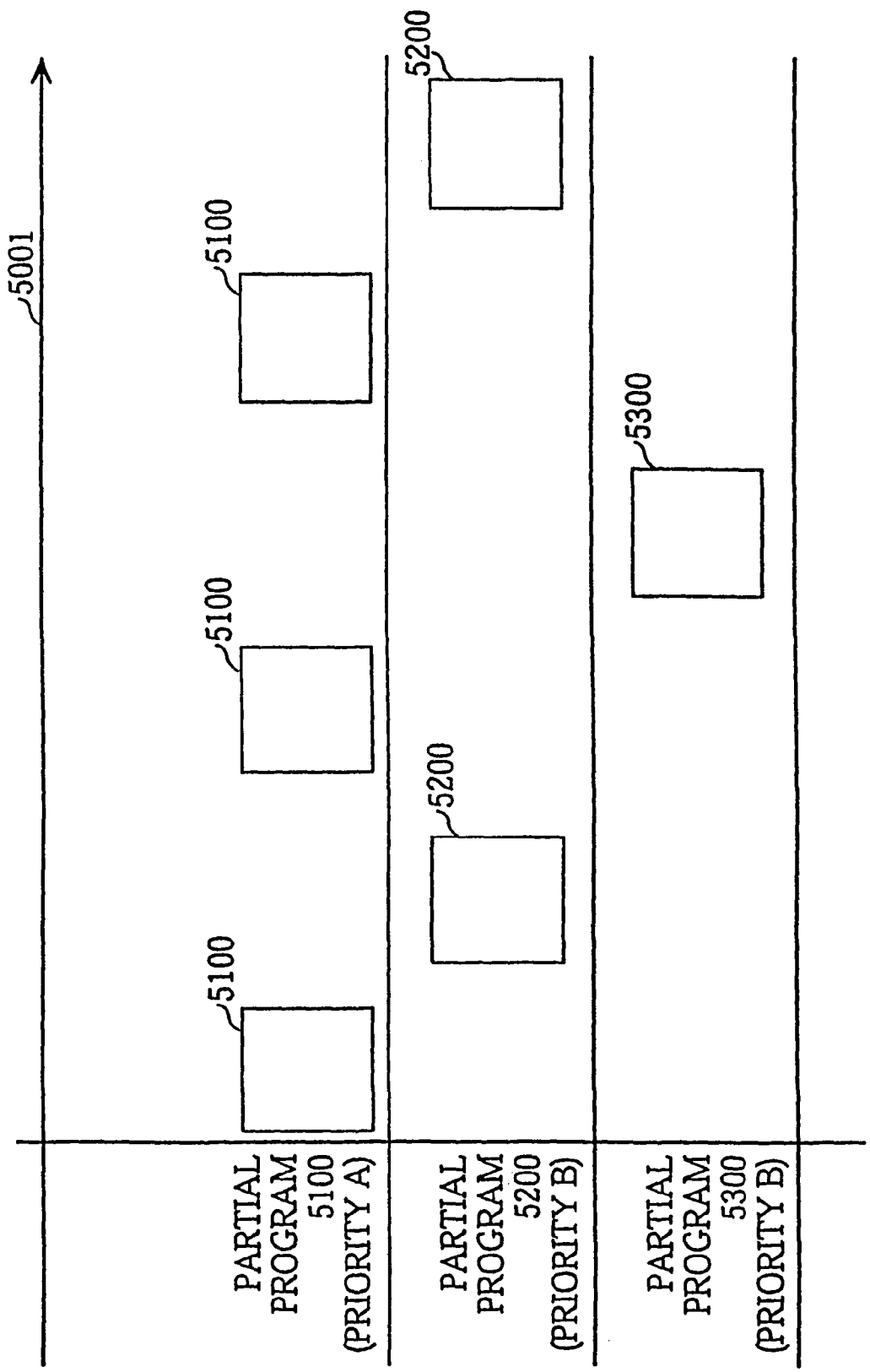
FIG. 24 is a representation of the multiplexing of the partial programs in accordance with the priorities.

FIG. 24 is a representation of the multiplexing of partial programs by the multiplexing unit 8061 in accordance with the set priority values.

In FIG. 24, when the multiplexing unit 8061 multiplexes a plurality of partial programs with other stream data in accordance with the set priority values, the respective timing of the multiplexing of the partial program 5100 with the priority value A, the multiplexing of the partial program 5200 with the priority value B, and the multiplexing of the partial program 5300 with the priority value B are shown with respect to the time axis 5001.

The multiplexing unit 8061 refers to the priority values stored in the predetermined area of the program storage unit 8010, determines the frequency over time with which each of the partial programs is to be multiplexed and then performs multiplexing. Here, partial programs with higher priority values are multiplexed with a higher frequency. For the example shown in FIG. 24, the multiplexing unit 8061 is shown to multiplex the partial program with the priority value A with a higher frequency that the partial programs with the priority value B.

As a result of the processing described above, when eventually transmitting a multiplexed machine program, the transmission unit 8060 ends up transmitting partial programs with a frequency that corresponds to their respective priority values.

The above processing has an expectation that the time taken by a digital broadcast reception apparatus to receive the partial program that serves as the entrance part of the main program, which is the fundamental requirement for the execution of the machine program, can be reduced.

Digital Broadcast Reception Apparatus

The digital broadcast reception apparatus of the present embodiment is described below.

Figure 25:
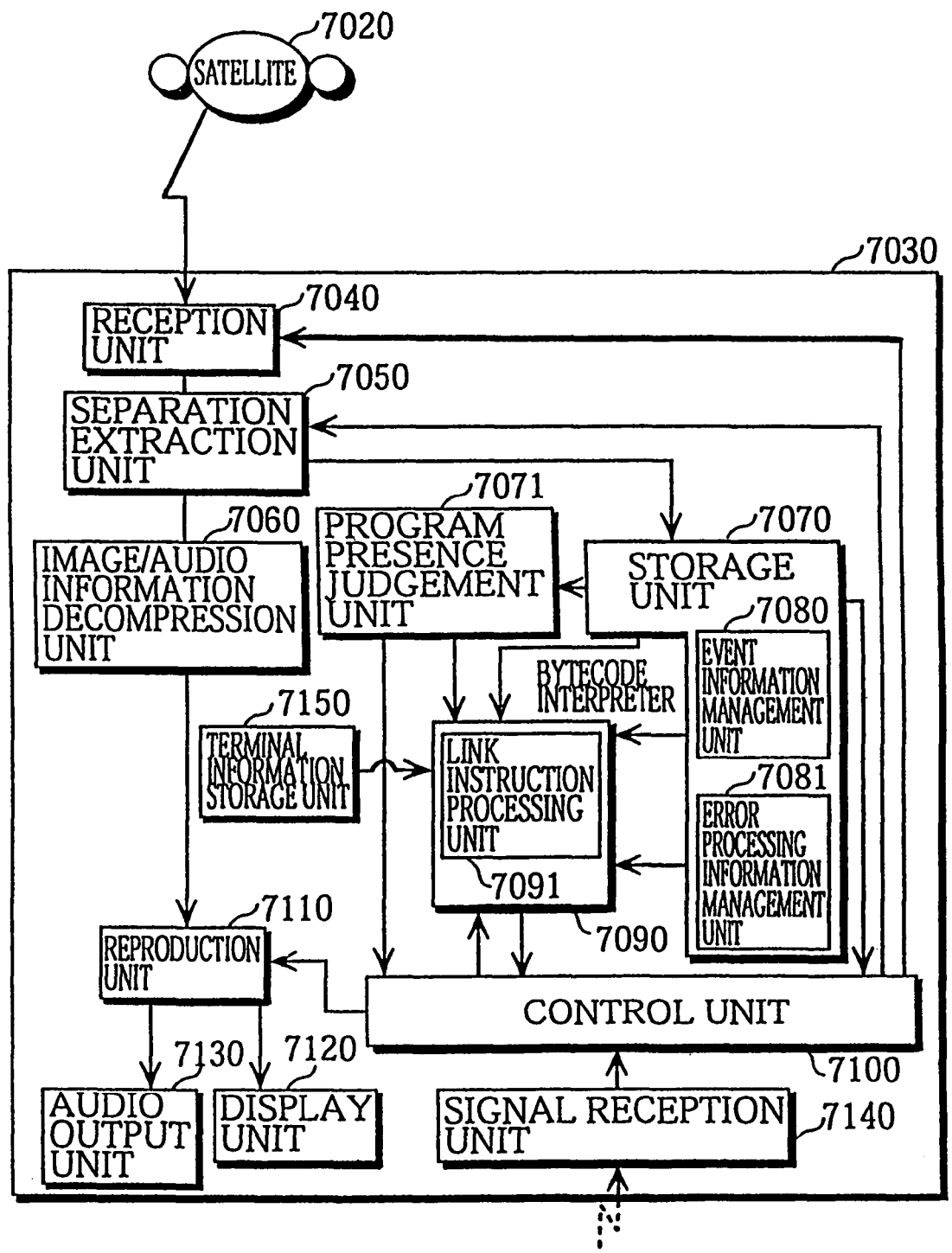
FIG. 25 is a block diagram showing the construction of the digital broadcast reception apparatus in the second embodiment.

FIG. 25 is a block diagram showing the configuration of the digital broadcast reception apparatus in this second embodiment.

The digital broadcast reception apparatus 7030 is an apparatus that conforms to ISO/IEC 13818 Standard and which receives broadcast programs transmitted by the digital broadcast transmission apparatus via the satellite 7020.

The digital broadcast reception apparatus 7030 is composed of a reception unit 7040, a separation extraction unit 7050, an image/audio information decompression unit 7060, a storage unit 7070, a program presence judgement unit 7071, a bytecode interpreter 7090, a control unit 7100, a reproduction unit 7110, a display unit 7120, an audio output unit 7130, a signal reception unit 7140, and a terminal information storage unit 7150.

The storage unit 7070 includes an event information management unit 7080 and an error processing information management unit 7081, and the bytecode interpreter 7090 includes a link instruction processing unit 7091.

In this configuration, the program presence judgement unit 7071, the bytecode interpreter 7090, and the control unit 7100 are composed of a memory, a control program stored in the memory, and a CPU.

The signal that is sent from a digital broadcast transmission apparatus is received by the reception unit 7040 of the digital broadcast reception apparatus 7030. This reception unit 7040 has a function for switching reception between different satellites. The separation extraction unit 7050 is a TS decoder which extracts the required streams from the received transport streams and transfers on the extracted data. The control unit 7100, meanwhile, controls the reception unit 7040 and the separation extraction unit 7050 such as by giving indications for a switching of received satellite or filtering.

The separation extraction unit 7050 performs the extraction of the required streams using either a PID or a combination of a PID and a table ID, and for example will extract the transport stream 200 with the PID "10" and store it in the storage unit 7070. Here, the control unit 7100 obtains the PIDs of the images, audio and other data from the system information sent as the transport stream 200 and instructs the separation extraction unit 7050 to perform extraction.

Image and audio data is directly sent to the image/audio information decompression unit 7060 by the separation extraction unit 7050. The image/audio information decompression unit 7060 is an MPEG2 decoder which decompresses the received compressed data in real time and supplies the decompressed data to the reproduction unit 7110.

The reproduction unit 7110 follows the instructions of the control unit 7100 and outputs image data to the display unit 7120 and audio data to the audio output unit 7130.

The separation extraction unit 7050 sends data aside from image data and audio data, which is to say the program information and the machine program for program control, to the storage unit 7070 in accordance with instructions given by the control unit 7100. As a result, data for program control, such as data for the Electric Program Guide (EPG) standardized for Digital Video Broadcasting (DVB) in Europe and the bytecode program that will be interpreted and executed by the bytecode interpreter 7090 are stored in the storage unit 7070.

It should be noted here that the bytecode program is divided into partial programs.

The data for the program control described above includes a table ID for a first partial program in each bytecode program that should be activated in response to one of a variety of events that can occur due to a user operation or due to the operation of the device. This data is stored in the event information management unit 7080 according to control by the control unit 7100.

Data which is error processing information is stored in the error processing information management unit 7081. Error processing information is composed of an error processing table and an error process in error processing table. The error processing information management unit 7081 also stores a default error processing table and a default error process in error processing table in advance.

The information stored in the event information management unit 7080 is referred to by the control unit 7100 in order to be able to indicate the partial program that is to be executed when the control unit 7100 activates the bytecode interpreter in response to the occurrence of an event.

The error processing information stored by the error processing information management unit 7081 is referred to by the bytecode interpreter 7090 when error processing is required.

The signal reception unit 7140 receives an input signal from the user which may be made using a remote controller or the like. The signal received by the signal reception unit 7140 is sent to the control unit 7100 as data, and the control unit 7100 performs a judgement on this data, before instructing the bytecode interpreter 7090 to execute a bytecode program or performing other service processing such as EPG.

It should be noted here that a memory management unit (not illustrated) is provided as a device that performs region management for the storage unit 7070. This memory management unit performs memory management for data write operations such as when a partial program is separated and extracted and needs to be written into the storage unit 7070. When there is insufficient free space in the storage unit 7070 for writing in a partial program, the memory management unit uses a Least Recently Used (LRU) algorithm to delete one or more of the partial programs stored in the memory and, having cleared sufficient space, writes the new partial program into the storage unit 7070.

The bytecode interpreter 7090 is an interpreter that can successively interpret and execute bytecode programs. When executing a bytecode program, the bytecode interpreter 7090 translates the bytecodes into native code for the processors in the various components in the digital broadcast reception apparatus and has the processors of these components activated.

Bytecode programs are transmitted having been divided into a plurality of partial programs at the digital broadcast transmission apparatus side, and so are each composed of a collection of partial programs.

The digital broadcast reception apparatus of this second embodiment differs from the digital broadcast reception apparatus of the first embodiment in that it includes a terminal information storage unit 7150 and that the bytecode interpreter 7090 operates having referred to the stored content of the terminal information storage unit 7150.

The following is a detailed description of how the bytecode interpreter 7090 operates having referred to the terminal information storage unit 7150. This description will refer to FIG. 26.

The terminal information storage unit 7150 stores terminal information relating to the processing ability level of the digital broadcast reception apparatus in which it is provided.

The digital broadcast reception apparatus described as an example of this second embodiment has a display processing ability of level 2.

Figure 26:
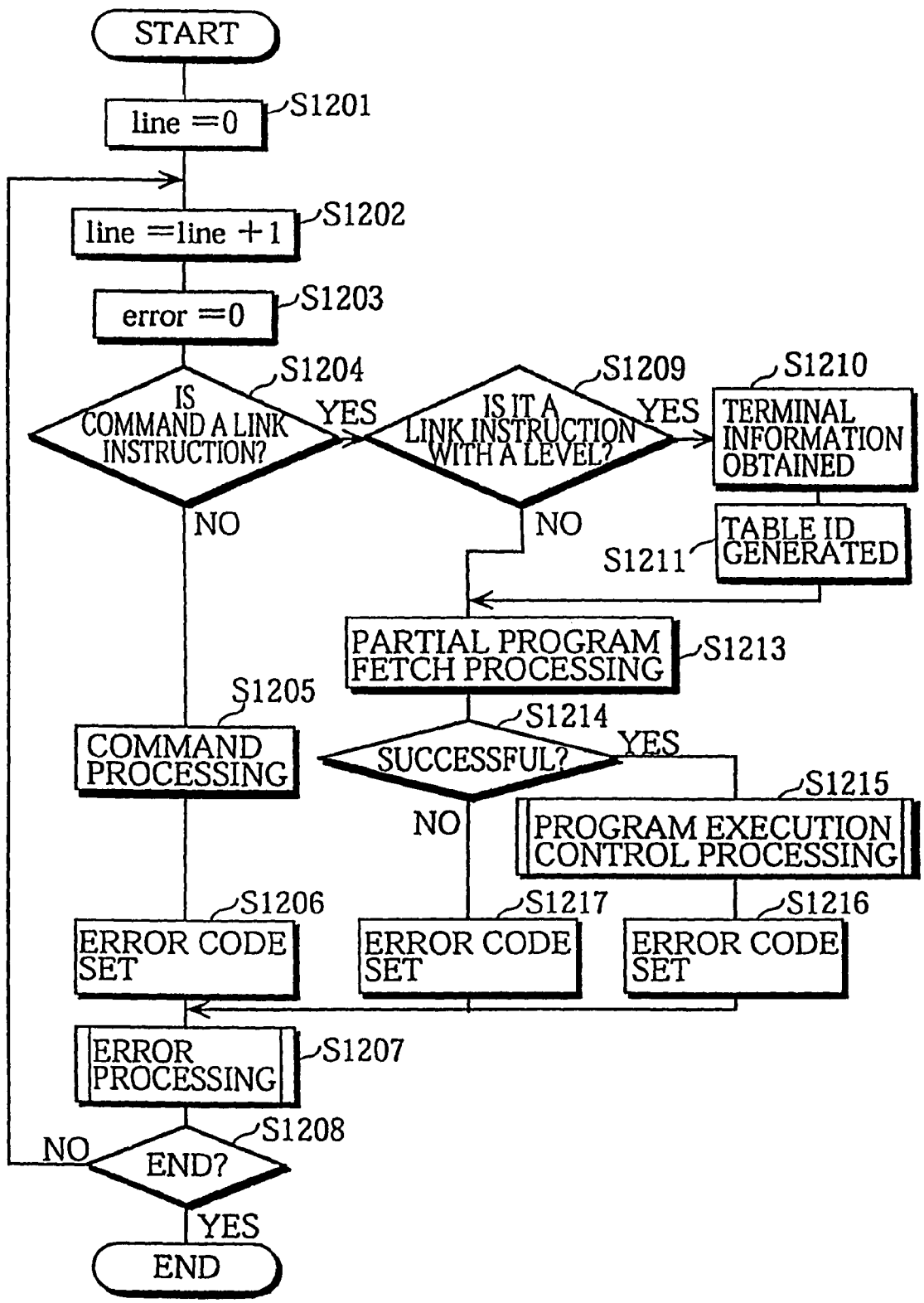
FIG. 26 is a flowchart showing the bytecode program execution control procedure performed by the bytecode interpreter 7090.

FIG. 26 is a flowchart showing the bytecode program execution/control process executed by the bytecode interpreter 7090.

The processing flow shown in FIG. 26 is a process that executes a bytecode program corresponding to an event that has occurred during the operation of each component or an event that has occurred as a result of a user operation.

First, the variable "line" which expresses a program line for reading, interpreting and executing is reset to "0" (step S1201). Following this, "1" is added to the variable "line" (step S1202), and the variable "error" which shows an error coded is reset to "0" (step S1203).

Next, the bytecode interpreter 1090 judges whether the command on the program line indicated by the variable "line" is a link instruction that is a command for fetching another partial program (step S1204). If not, the command processing is performed (step S1205).

The following explanation will deal with a state where a link instruction which is a bytecode for "GET 6010X" is to be executed.

The bytecode which represents the meaning "GET 6010X" is a link instruction, so that the processing proceeds from step S1204 to step S1209.

A judgement as to whether the link instruction is a level-dependent link instruction is made (step S1209) and when this is the case, the bytecode interpreter 7090 obtains the terminal information from the terminal information storage unit 7150 (step S1210). On obtaining the terminal information "level 2", the bytecode interpreter 7090 generates the next table ID (step S1211). As a result, the table ID "60102" is generated.

Accordingly, in the next partial program fetch process, the partial program with the table ID 60102 is fetched (step S1213).

The processing thereafter in steps S1214 to S1208 is the same as the processing in steps S306 to S313 in FIG. 14 which were described in the first embodiment. As a result, no further explanation will be given.

As a result of the processing described above, when a machine program that includes level-dependent processing is divided and transmitted, the present digital broadcast reception apparatus will be able to obtain and execute only the partial programs for the processing level of the present digital broadcast reception apparatus, so that partial programs for other levels will not be fetched into the storage unit 7070. As a result, the storage capacity of the digital broadcast reception apparatus which is not used effectively can be reduced, and processing that is suitable for the processing level of the reception apparatus can be performed.

As a modification of this second embodiment, it is possible for the digital broadcast reception apparatus to operate so that specified partial programs, out of the partial programs that have been received, separated, extracted, stored in the storage apparatus, and used, will not be deleted from the storage apparatus until a set of machine program processing composed of the plurality of partial programs has been completed. This allows the execution of the specified partial programs to be recommenced at high speed. This modification is described in more detail below.

Modification of the Digital Broadcast Transmission Apparatus

The construction of this digital broadcast transmission apparatus is the same as that described in the second embodiment (see FIG. 19), so that the following explanation will use the same names and reference numbers for the various components. The difference in this modification with the second embodiment lies in the operation of the program dividing unit 8050.

The following is a description of the operation of the program dividing unit 8050 in this modification.

The program dividing unit 8050 operates in accordance with the flowchart shown in FIG. 12 in the same way as in the second embodiment, although the processing differs in that an operation for inserting a "LOCK" instruction into specified partial programs on referring to the program structure information storage unit 8011 is included after step S3130.

Information for identifying the specified partial programs is stored beforehand in the program structure information storage unit 8011.

In more detail, when the machine program has a structure whereby during execution, one part of the machine program has the potential to be called two or more times by other parts of the program, such as when the machine program has a structure where the called part is a shared module that may be called by a plurality of other program modules, the program structure information storage unit 8011 will store information which identifies the repeatedly called part of the machine program. In the following description, when the repeatedly called part of the machine program is divided into partial programs, the resulting partial programs are called common partial programs.

The program dividing unit 8050 refers to the program structure information storage unit 8011 and when dividing the machine program into partial programs, inserts a "LOCK" instruction into a position within the instruction sequence of each of the common partial programs.

As a result of the processing described above, the program dividing unit 8050 divides the machine program and inserts "LOCK" instructions where necessary, and the machine program that has been divided by the program dividing unit 8050 is eventually transmitted by the transmission unit 8060. In this way, the digital broadcast reception apparatus can obtain "LOCK" instructions which are information indicating common partial programs should not be deleted.

Modification of the Digital Broadcast Reception Apparatus

A modification of the digital broadcast reception apparatus is described below.

The configuration of this modification of the digital broadcast reception apparatus is the same as that of the digital broadcast reception apparatus of the second embodiment (see FIG. 25), so that the following explanation will use the same names and reference numbers for the various components. The difference in this modification with the second embodiment lies in the operation of the memory management unit and the operation of the bytecode interpreter 7090.

In this modification, the bytecode interpreter 7090 operates in accordance with the flowchart shown in FIG. 26 so as to execute the partial programs transmitted by the digital broadcast transmission apparatus, although in the command processing of step S1205, the processing performed when there is a "LOCK" instruction differs to that described in the second embodiment.

When there is a "LOCK" instruction, the bytecode interpreter 7090 informs the memory management unit that the partial program including the "LOCK" instruction is a common partial program.

The memory management unit performs memory management when partial programs that have been separated and extracted are written into the storage unit 7070. When there is insufficient space in the storage unit 7070 to store a new partial program, the memory management unit uses a Least Recently Used (LRU) algorithm to delete one or more of the partial programs stored in the memory and, having cleared sufficient space, writes the new partial program into the storage unit 7070. However, the memory management unit ensures that no common partial programs are deleted from the storage unit 7070 until the machine program that is composed of the set of partial programs has been completed.

Since the memory management unit operates in this way, when the digital broadcast reception apparatus is required to repeatedly call a common partial program when executing the machine program, it will not be necessary to newly receive, separate, and extract the common partial program for the second execution onwards as the common partial program will definitely be stored in the storage unit 7070. This means that the execution of common partial programs can be commenced at high speed.

While the program transmission apparatus and program reception apparatus of the present invention have been explained by way of the first and second embodiments given above, the present invention should not be construed as being limited to these embodiments since several modifications are possible. Examples of such modifications are given below.

(1) In both embodiments, the digital broadcast reception apparatus which is the program reception apparatus is described as definitely performing an error process, although the apparatus may only perform the error process when an error has actually occurred.

(2) In both embodiments, the error processing table and the error process in error processing table are described as being separate tables, although it is possible for their contents to be combined into one table where the assigned codes are combined.

(3) In both embodiments, the default error processing is also performed by way of a table, although this default error processing may be achieved through hard coding within the bytecode interpreter.

(4) In both embodiments, the digital broadcast transmission apparatus which is the program transformation apparatus transmits an error table as data in a private section of an MPEG2 transport stream, although the digital broadcast transmission apparatus may instead transmit a bytecode program for generating the error table, with the error table then being generated by the digital broadcast reception apparatus which is the program reception apparatus.

(5) In both embodiments, the digital broadcast reception apparatus which is the program reception apparatus receives data transmitted by the digital broadcast transmission apparatus which is the program transmission apparatus via a satellite, although it may instead directly receive the data or may receive the data via a cable.

(6) In both embodiments, the digital broadcast reception apparatus which is the program reception apparatus receives data that has been transmitted by the digital broadcast transmission apparatus which is a program transmission apparatus, although the digital broadcast reception apparatus may instead read data from a recording medium such as a CD-ROM.

(7) In both embodiments, the digital broadcast transmission apparatus which is the program transmission apparatus divides a machine program into partial programs that have a size which will fit into transport packets, although the present invention is not limited to such division. It is equally possible for the partial programs that result from the division to have sizes that are larger than one transport packet. In such case, the digital broadcast reception apparatus which is the program reception apparatus will still be able to extract the desired partial programs by indicating a PID and a table ID to the separation extraction unit. This is because while the separation extraction unit is a TS decoder, it will still continuously extract all transport packets with a same PID and a same table ID.

(8) In both embodiments, the PID of the system information was given as "10", the PID of the set of partial programs was given as "11", the PID of image data was given as "12", and the PID of audio data was given as "13" although the present invention is not restricted to these values, so that any values that enable the various types of data to be identified can be used.

(9) In both embodiments, "GET n" and "GET nX" were used as the link instructions for obtaining and executing the divided partial programs, although the bytecode interpreter of the digital broadcast reception apparatus which is the program reception apparatus may use other kinds of code so long as such code will be interpreted as "obtain and execute a partial program". The table ID was also described as being directly inserted as the variable "n", although it is possible for the table IDs of partial programs to be indirectly indicated by means of IDs that are listed in a separate table.

(10) In both embodiments, the partial programs were described as being executed from the start, although it is equally possible for the execution of a partial program to be commenced from an indicated line in the partial program. To do so, a two-variable link instruction "GET n,1" may be used in place of the "GET n" format described above, where the variable "n" indicates the table ID and the variable "1" indicates the line number from which the execution of the partial program is to be commenced. The digital broadcast reception apparatus which is the program reception apparatus may also be modified so as to be able to interpret and execute this instruction format.

(11) In both embodiments, the bytecode interpreter of the digital broadcast reception apparatus which is the program reception apparatus fetches the required partial program on reading a link instruction in a present partial program, although it is equally possible for the bytecode interpreter to read the link instruction at the start of the execution of the present partial program or thereafter, and then perform the fetch processing for a partial program which may potentially be required next.

(12) In both embodiments, the program presence judgement unit, the bytecode interpreter, and the control unit are all described as being composed of a memory, a control program stored in the memory, and a CPU, although any number of these components may be composed of hardware.

(13) In both embodiments, the partial program fetch processing of the digital broadcast reception apparatus which is the program reception apparatus is such that if a partial program is not present, the separation extraction unit is instructed via the control unit to extract the required partial program. However, the digital broadcast reception apparatus may instead send a transmission request, including the identifier of the required partial program, to the digital broadcast transmission apparatus. This transmission of a transmission request may be performed according to conventional transmission techniques.

(14) In both embodiments, the digital broadcast transmission apparatus which is the program transmission apparatus performs a one-way transmission of partial programs, although when a transmission request for a partial program that includes an identifier of a partial program has been received from the program reception apparatus, the digital broadcast transmission apparatus may transmit the requested program.

(15) In both embodiments, the memory management unit of the digital broadcast reception apparatus which is the program reception apparatus is described as using an LRU algorithm to select partial programs to be deleted when storing partial programs in the storage apparatus, although other selection methods may be used.

Instead of deleting partial programs to create free space in the storage apparatus, partial programs may be transferred to a supplementary storage apparatus or the like. When doing so, the partial programs that are sent to the supplementary storage apparatus may be transferred back into the storage apparatus when the check to see whether. partial programs are present is performed in step S4010 in the flowchart of FIG. 15, with the check result being set at "desired partial program present". However, when the execution of a machine program that includes a plurality of partial programs is completed after a partial program has been sent to the supplementary storage apparatus, the partial programs that have been sent to the supplementary storage apparatus will be treated as not being present.

(16) In the modification of the second embodiment, a "LOCK" instruction is used as the lock instruction, although this need not be the case. Any instruction that indicates that a partial program is a common partial program may be used. In fact, an instruction does not need to be used, so that if identification information that shows that a partial program is a common partial program is transmitted by the digital broadcast transmission apparatus which is the program transmission apparatus, the memory management unit of the digital broadcast reception apparatus which is the program reception apparatus will be able to determine whether each partial program is a common partial program before storing each partial program into the storage apparatus.

(17) In the second embodiment, the terminal information is described as being already stored in the terminal information storage unit 7150, although the digital broadcast reception apparatus which is the program reception apparatus may receive a bytecode program for investigating the processing level of the reception apparatus from the digital broadcast transmission apparatus. This bytecode program may be sent when the digital broadcast reception apparatus is activated or starts to receive a digital broadcast service, with the digital broadcast reception apparatus executing this bytecode program and storing the result in the terminal information storage unit 7150.

(18) In the second embodiment, the digital broadcast transmission apparatus which is the program transmission apparatus treats the processing level of the reception apparatus as one of three levels, although this processing level can be divided into any number of processing levels which may be based on display capability, audio reproduction capability, or any other kind of processing.

(19) In the second embodiment, the digital broadcast transmission apparatus which is the program transmission apparatus is described as determining the transmission frequencies of partial programs by assigning different priority values to partial programs depending on the depth of the branch structure in the machine program, although it is equally possible for different partial programs with the same depth in the branch structure to be assigned completely different priority values but at the same time be transmitted with the same frequency. Different priority values may also be assigned to groups of the partial programs on two or three levels in the branch structure, with it being possible to use any algorithm for assigning the priority values.

(20) In both embodiments, the processing procedure (which is to say the procedures shown in the flowcharts of FIGS. 14, 15, 16, and 26) of the digital broadcast reception apparatus can be achieved by machine language programs which may be recorded onto a storage medium which is then distributed and/or sold. The storage medium for storing these machine language programs can be an IC card, an optical disk, a flexible disk, or a ROM, with the machine language programs stored therein being installed into a common hardware construction to enable its use. An example of such a common hardware construction is a standard personal computer which successively executes the installed machine language programs and so achieves the functions of the digital broadcast reception apparatus which is the program reception apparatus described in both embodiments.

INDUSTRIAL FIELD OF APPLICATION

The program transmission apparatus and program reception apparatus of the present invention can be realized by a personal computer that transmits or receives large programs such as games via a computer network, or by a transmission apparatus and a reception apparatus for digital broadcasts that are transmitted or received together with interactive programs that require high-speed response.

The invention claimed is:

1. A program reception execution apparatus that receives and executes a program, the program having been transmitted by a program transmission apparatus after being divided into a plurality of partial programs that each include a set of next partial program information which shows what partial program should be executed following a present partial program, the program reception execution apparatus comprising:
   storage means including a program storage area;
   reception means for receiving the plurality of partial programs and storing the plurality of partial programs in the storage means; and
   execution control means for executing the plurality of partial programs that are stored in the storage means, wherein the execution control means includes:
   a program presence judgment unit for judging whether an indicated partial program is stored in the storage means;
   a program preparation unit
   (1) for referring to a set of next partial program information, for indicating, when a first partial program is being executed and a second partial program is to be executed next, the second partial program based on the set of next partial program information, and for having the program presence judgment unit judge whether the second partial program is stored in the storage means,
   (2) for preparing for an execution of the second partial program when the program presence judgment unit has judged that the second partial program is present,
   (3) for waiting and not allowing an execution of the program to advance when the program presence judgment unit has judged that the second partial program is not present, and for preparing for an execution of the second partial program when the program presence judgment unit judges that the second partial program is present; and
   a program execution unit for executing a plurality of instructions in a partial program whose execution has been prepared by the program preparation unit and for activating the program preparation unit.

* * * * *